(12) United States Patent
Shimizu

(10) Patent No.: US 6,189,987 B1
(45) Date of Patent: Feb. 20, 2001

(54) BRAKE FORCE CONTROL APPARATUS

(75) Inventor: Satoshi Shimizu, Susono (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/171,645

(22) PCT Filed: Apr. 22, 1997

(86) PCT No.: PCT/JP97/01382

§ 371 Date: Oct. 22, 1998

§ 102(e) Date: Oct. 22, 1998

(87) PCT Pub. No.: WO97/41017

PCT Pub. Date: Nov. 6, 1997

(30) Foreign Application Priority Data

Apr. 26, 1996 (JP) .................................................. 8-108105

(51) Int. Cl.$^7$ ........................................................ B60T 8/32
(52) U.S. Cl. ........................ 303/194; 303/155; 303/196; 303/113.4
(58) Field of Search .................................. 303/196, 194, 303/155, 20, 113.4, 163

(56) References Cited

U.S. PATENT DOCUMENTS

| 5,158,343 | 10/1992 | Reichelt et al. . |
| 5,261,730 | 11/1993 | Steiner et al. . |
| 5,350,225 | 9/1994 | Steiner et al. . |

(List continued on next page.)

FOREIGN PATENT DOCUMENTS

| 0711695 | 5/1996 | (EP) . |
| 2282649 | 4/1995 | (GB) . |
| 2295209 | 5/1996 | (GB) . |

(List continued on next page.)

OTHER PUBLICATIONS

Copending U.S. application Ser. No. 09/155,769, filed Oct. 2, 1998.
Copending U.S. application Ser. No. 09/171,498, filed Oct. 20, 1998.
Copending U.S. application Ser. No. 09/171,587, filed Oct. 21, 1998.
Copending U.S. application Ser. No. 09/171,582, filed Oct. 21, 1998.
Copending U.S. application Ser. No. 09/171,588, filed Oct. 21, 1998.
Copending U.S. application Ser. No. 09/171,507, filed Oct. 21, 1998.
Copending U.S. application Ser. No. 09/171,589, filed Oct. 21, 1998.
Copending U.S. application Ser. No. 09/171,644, filed Oct. 22, 1998.

(List continued on next page.)

*Primary Examiner*—Robert J. Oberleitner
*Assistant Examiner*—Devon Kramer
(74) *Attorney, Agent, or Firm*—Kenyon & Kenyon

(57) ABSTRACT

This relates to a brake force control apparatus that executes a brake assist control, which generates, when a driver performs an emergency braking, a brake force greater than that generated at a normal time. The brake force control apparatus is inhibited from being unnecessarily executed at the time of traveling a rough road or passing a step. When it is determined, based on an operation of a brake pedal, that an emergency braking is performed, it is determined whether the road on which the vehicle is traveling is a rough road (step 114). If the road is not rough, it is further determined whether the vehicle is passing a step (step 116). The brake assist control is executed only when it is determined that the vehicle is not passing a step (steps 118–126).

16 Claims, 12 Drawing Sheets

U.S. PATENT DOCUMENTS

| | | |
|---|---|---|
| 5,367,942 | 11/1994 | Nell et al. . |
| 5,425,574 * | 6/1995 | Sano ........................................ 303/97 |
| 5,427,442 | 6/1995 | Heibel . |
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,549,369 | 8/1996 | Rump et al. . |
| 5,556,173 | 9/1996 | Steiner et al. . |
| 5,564,791 | 10/1996 | Steiner et al. . |
| 5,567,021 | 10/1996 | Gaillard . |
| 5,584,542 | 12/1996 | Klarer et al. . |
| 5,586,814 | 12/1996 | Steiner . |
| 5,588,721 * | 12/1996 | Asano et al. ........................ 303/163 |
| 5,658,055 | 8/1997 | Dieringer et al. . |
| 5,660,448 * | 8/1997 | Keisewetter et al. ................ 303/155 |
| 5,669,676 | 9/1997 | Rump et al. . |
| 5,719,769 | 2/1998 | Brugger et al. . |
| 5,720,532 | 2/1998 | Steiner et al. . |
| 5,772,290 | 6/1998 | Heibel et al. . |

FOREIGN PATENT DOCUMENTS

| | | |
|---|---|---|
| 61-268560 | 11/1986 | (JP) . |
| 3-227766 | 10/1991 | (JP) . |
| 4-121604 | 4/1992 | (JP) . |
| 5-97022 | 4/1993 | (JP) . |
| 7-329766 | 12/1995 | (JP) . |
| 8-34326 | 2/1996 | (JP) . |
| 8-40229 | 2/1996 | (JP) . |
| 8-295224 | 11/1996 | (JP) . |
| WO96/6763 | 3/1996 | (WO) . |

OTHER PUBLICATIONS

Copending U.S. application Ser. No. 09/180,014, filed Oct. 29, 1998.

Copending U.S. application Ser. No. 09/194,136, filed Nov. 25, 1998.

Copending U.S. application 09/108,007, filed Jun. 30, 1998.

Copending U.S. application 09/107,771, filed Jul. 2, 1998.

* cited by examiner

BRAKE FORCE CONTROL APPARATUS

TECHNICAL FIELD

The present invention relates to a brake force control apparatus and, more particularly, to a brake force control apparatus which generates a brake force greater than that generated at an ordinary time, when an emergency braking is performed by a driver of a vehicle.

Conventionally, for example, as disclosed in Japanese Laid-Open Patent Application 4-121260, a brake force control apparatus is known which generates, when an emergency braking is required, a brake force greater than that generated in a normal time. The above-mentioned conventional apparatus is equipped with a brake booster, which generates a pushing force having a given power ratio with respect to brake pressing force Fp. The pushing force generated by the brake booster is transformed to a master cylinder. The master cylinder generates a master cylinder pressure PM/C based on the pushing force of the brake booster, that is, the brake pressing force Fp.

The above-conventional apparatus is equipped with a fluid pressure generating mechanism, which generates an assist hydraulic pressure in which a pump is used as a fluid pressure source. The fluid pressure generating mechanism generates the assist hydraulic pressure based on a driving signal supplied from a control circuit. When the brake pedal is operated at a speed higher than a predetermined speed, the control circuit determines that an emergency braking is carried out by the driver, and outputs to the fluid pressure generating mechanism a drive signal which requests a maximum assist hydraulic pressure.

The assist hydraulic pressure generated by the fluid pressure generating mechanism and the master cylinder pressure PM/C generated by the master cylinder are both supplied to a change valve. If the assist hydraulic pressure is higher than the master cylinder pressure PM/C, the change valve supplies the wheel cylinder to the assist hydraulic pressure. If the master cylinder pressure PM/C is higher than the assist hydraulic pressure, he change valve supplies the master cylinder pressure PM/C to the wheel cylinder.

According to the conventional apparatus, if the brake pedal is operated at a speed equal to or less than the given operating speed, the master cylinder pressure PM/C adjusted to a level depending on the brake pressing force Fp is supplied to the wheel cylinders. Hereinafter, the control of realizing the above-mentioned state will be referred to as a normal control. If the brake pedal is operated at a speed higher than the given operating speed, a high assist hydraulic pressure is supplied to the wheel cylinders in which the pump serves as a fluid pressure source. Hereinafter, the control of realizing the above-mentioned state will be referred to as a brake assist control. Hence, according to the conventional apparatus, a brake force based on the brake pressing force Fp obtained when the driver performs normal braking can be generated, and can rapidly be raised after an emergency braking is performed.

However, besides a situation in which the driver intentionally performs the emergency braking, the brake pedal may be pressed at a high speed if the vehicle is traveling on a rough road or the vehicle rides over a step on the road. According to the above conventional apparatus, the brake assist control is performed without exception when the brake pedal is depressed at a speed equal to or higher than the predetermined value irrespective of the vehicle traveling environment. Hence, the conventional apparatus may generate an unnecessarily large braking force when the vehicle is traveling on a rough road or passing a step.

SUMMARY OF INVENTION

The present invention is made in view of the above-mentioned point, and it is an object of the present invention to provide a brake force control apparatus which cannot generate an unnecessarily large brake force when an emergency brake is performed while a vehicle is traveling on a rough road or riding over a step.

A first brake force control apparatus that achieves the object executes a normal control of generating a brake force based on a brake pressing force, and a brake assist control of generating a brake force greater than that generated at a normal time. This brake force control apparatus is equipped with operation speed detection means for detecting a brake operation speed, and determines that a condition for execution of the brake assist control related to the brake operation speed stands when the brake operation speed exceeds a predetermined speed. Further, the brake force control apparatus of the present invention is equipped with body vibration detection means for detecting a body vibration of a vehicle, and changes the predetermined speed on the basis of the body vibration.

When the vehicle is traveling on a rough road or when the vehicle is passing a step, a large body vibration is likely to occur. If a large body vibration occurs when the vehicle is traveling, the brake operation may temporarily be performed at a higher speed. Hence, if a large body vibration is generated, the condition for execution of the brake assist control related to the brake operation speed may stand easily although the driver does not perform the emergency braking. The first execution condition change means changes the predetermined speed based on the body vibration in order to prevent the condition for execution of the brake assist control in cases as described above. Hence, according to the brake assist control of the present invention, it is possible to create a situation in which the brake assist control is started with more difficulty at the time of traveling a rough road or passing a step.

A second brake force control apparatus directed to achieving the above object executes a normal control of generating a brake force based on a brake pressing force, and a brake assist control of generating a brake force greater than that generated at a normal time. This brake force control apparatus is equipped with operation speed detection means for detecting a brake operation speed, and determines that a condition for execution of the brake assist control related to the brake operation speed stands when the brake operation speed exceeds a predetermined speed. Further, the brake force control apparatus of the present invention is equipped with body vibration detection means for detecting a body vibration of a vehicle, and inhibits execution of the brake assist control when the predetermined body vibration is detected.

In the present invention, the first execution inhibiting means inhibits execution of the brake assist control when the predetermined body vibration occurs. Hence, when the vehicle is traveling on a rough road or passing a step, the brake assist control is not executed even if the braking is performed due to the body vibration. Thus, according to the brake force control apparatus of the present invention, it is possible to definitely prevent the brake assist control from being executed due to an external turbulence.

A third brake force control apparatus directed to achieving the above-mentioned object executes a normal control of generating a brake force based on a brake pressing force, and a brake assist control of generating a brake force greater than that generated at a normal time. This brake force control apparatus is equipped with operation speed detection means for detecting a brake operation speed, and determines that a condition for execution of the brake assist control related to the brake operation speed stands when the brake operation speed exceeds a predetermined speed. Further, the brake force control apparatus of the present invention is equipped with road surface condition detection means for detecting a road surface condition, and changes the predetermined speed on the basis of the road surface condition.

A high-speed braking operation may temporarily be detected although the driver does not actually perform the emergency braking. The second execution condition change means changes the predetermined speed on the basis of the road surface condition in order to prevent the condition for execution of the brake assist control from standing. Hence, according to the brake force control apparatus of the present invention, it is possible to create a situation in which the brake assist control is started with more difficulty at the time of traveling a rough road or passing a step.

A fourth brake force control apparatus directed to achieving the above-mentioned object executes a normal control of generating a brake force based on a brake pressing force, and a brake assist control of generating a brake force greater than that generated at a normal time. This brake force control apparatus is equipped with operation speed detection means for detecting a brake operation speed, and determines that a condition for execution of the brake assist control related to the brake operation speed stands when the brake operation speed exceeds a predetermined speed. Further, the brake force control apparatus of the present invention is equipped with road surface condition detection means for detecting a road surface condition, and inhibits execution of the brake assist control on the basis of the road surface condition.

In the present invention, the second execution inhibiting means inhibits execution of the brake assist control when a road surface condition, which is estimated to generate a large body vibration, is detected. Hence, when the vehicle is traveling on such a road surface, the brake assist control is not executed even when the braking operation is performed at a high speed due to the body vibration. Thus, it is possible to definitely prevent the brake assist control from being executed due to a braking operation resulting from an external turbulence.

BEST MODE FOR CARRYING OUT THE INVENTION

Figure 1:
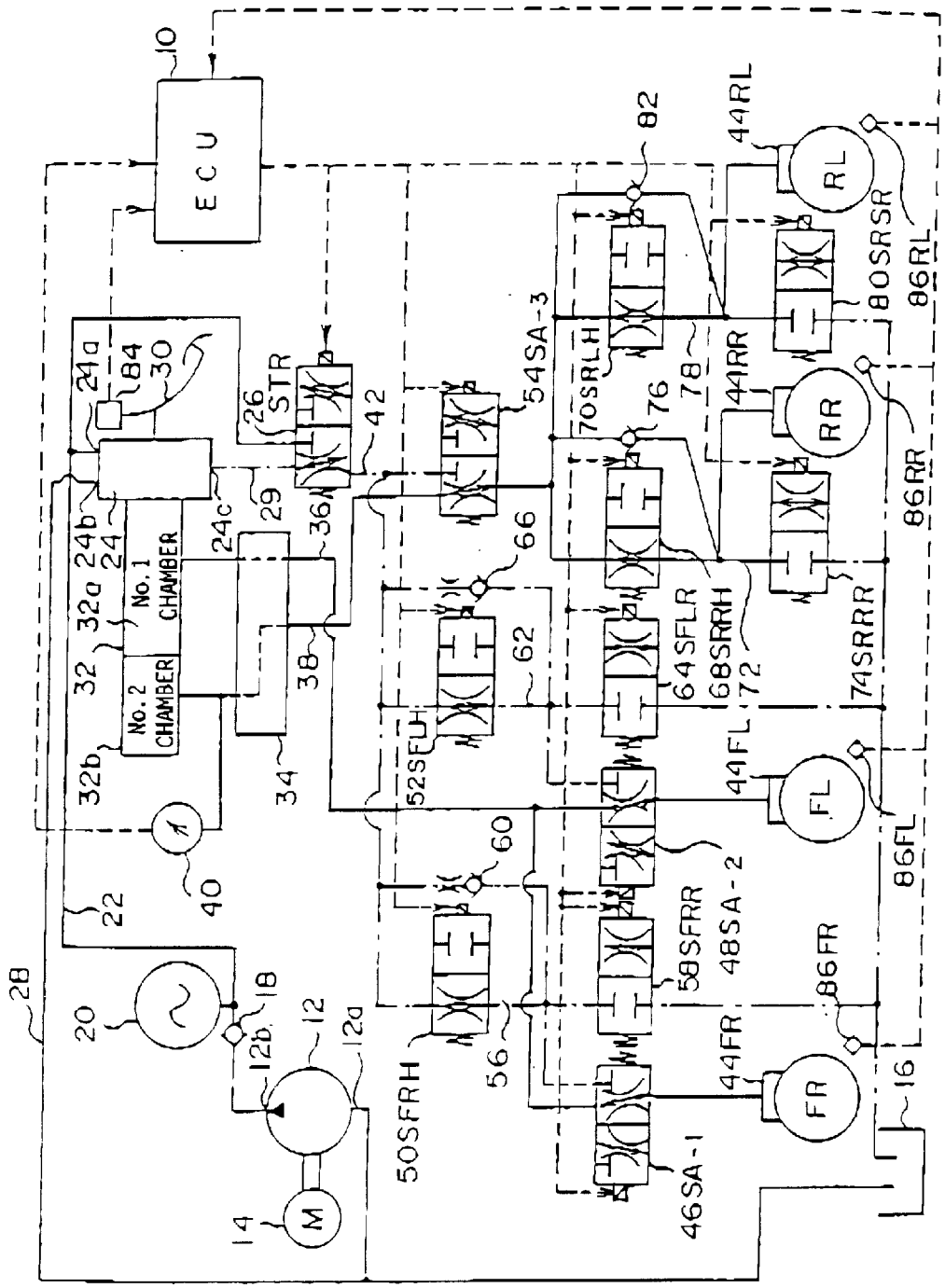
FIG. 1 is a system structure diagram of a brake force control apparatus according to an embodiment of the present invention.

FIG. 1 is a system structure diagram of a brake force control apparatus according to an embodiment of the present invention. The brake force control apparatus shown in FIG. 1 is controlled by an electronic control unit 10 (hereinafter, referred to as ECU 10). The brake force control apparatus comprises a pump 12. The pump 12 has a motor 14 as a power source thereof. An inlet port 12a of the pump 12a communicates with a reservoir tank 16. An accumulator 20 communicates with an outlet port 12b of the pump via a check valve 18. The pump 12 delivers brake fluid in the reservoir tank 16 from the outlet port 12b so that a predetermined pressure is always accumulated in the accumulator 20.

The accumulator 20 communicates with a high-pressure port 24a of a regulator 24 via a high-pressure passage 22, and communicates with a regulator switching solenoid 26 (hereinafter referred to as STR 26). The regulator 24 has a low-pressure port 24b and a control fluid pressure port 24c. The low-pressure port 24b communicates with the reservoir tank 16 via a low-pressure passage 28. The control fluid pressure port 24c communicates with the STR 26 via a control fluid pressure passage 29. The STR 26 is a two-position solenoid valve which selectively set one of the control fluid pressure passage 29 and the high-pressure passage 22 in a conductive state, and sets the control fluid pressure passage 29 in a conductive state and sets the high-pressure passage 22 in a closed state in a normal state.

A brake pedal 30 is connected to the regulator 24, and a master cylinder is mounted to the regulator 24. The regulator 24 has a fluid pressure chamber therein. The fluid pressure chamber always communicates with the control fluid pressure port 24c, and selectively communicates with the high-pressure port 24a or the low-pressure port 24b in accordance with an operational state of the brake pedal 30. The regulator 24 is configured so that a pressure inside the fluid pressure chamber is adjusted to a fluid pressure corresponding to a brake pressing force FP exerted on the brake pedal 30. Accordingly, the fluid pressure corresponding to the brake pressure force FP always appears at the control fluid pressure port 24c of the regulator 24. Hereinafter, this fluid pressure is referred to as a regulator pressure PRE.

The brake pressing force FP exerted on the brake pedal 30 is mechanically transmitted to the master cylinder 32 via the regulator 24. Additionally, a force corresponding to the fluid pressure inside the fluid pressure chamber of the regulator 24, that is, a force corresponding to the regulator pressure PRE, is transmitted to the master cylinder 32.

The master cylinder 32 is provided with a first fluid pressure chamber 32a and a second fluid pressure chamber 32b therein. A master cylinder pressure PM/C corresponding to a resultant force of the brake pressing force FP and a brake assist force FA is generated in the first fluid pressure chamber 32a and the second fluid pressure chamber 32b. Both the master cylinder pressure PM/C generated in the first fluid pressure chamber 32a and the master cylinder pressure PM/C generated in the second fluid pressure chamber 32b are supplied to a proportioning valve 34 (hereinafter, referred to as P valve 34).

The P valve 34 communicates with a first fluid pressure passage 36 and a second fluid pressure passage 38. The P valve 34 supplies the master cylinder pressure PM/C to the first fluid pressure passage 36 and the second fluid pressure passage 38 without change in a range where the master cylinder pressure PM/C is less than a predetermined value. Additionally, the P valve 34 supplies the master cylinder pressure PM/C to the first fluid pressure passage 36 without change and supplies a fluid pressure obtained by decreasing the master cylinder pressure PM/C by a predetermined ratio to the second fluid pressure passage 38 in a range where the master cylinder pressure is less than a predetermined value.

A hydraulic pressure sensor 40, which outputs an electric signal corresponding to the master cylinder pressure PM/C, is provided between the second fluid pressure chamber 32b of the master cylinder 32 and the P valve 34. An output signal of the hydraulic pressure sensor 40 is supplied to the ECU 10. The ECU 10 detects the master cylinder pressure PM/C generated in the master cylinder 32 based on the output signal of the hydraulic pressure sensor 40.

The above-mentioned STR 26 communicates with a third fluid pressure passage 42. The third fluid pressure passage 42 communicates with one of the control fluid pressure passage 29 and the high-pressure passage 22 in accordance with a state of the STR 26. In the present embodiment, wheel cylinders 44FL and 44FR provided to left and right front wheels FL and FR are provided with a brake fluid pressure from the first fluid pressure passage 36 communicating with the P valve 34 or the third fluid pressure passage 42 communicating with the STR 26. Additionally, wheel cylinders 44RL and 44RR provided to left and right rear wheels RL and RR are provided with a brake fluid pressure from the second fluid pressure passage 38 communicating with the P valve 34 or the third fluid pressure passage 42 communicating with the STR 26.

The first fluid pressure passage 36 communicates with a first assist solenoid valve 46 (hereinafter referred to as SA-1 46) and a second assist solenoid valve 48 (hereinafter, referred to as SA-2 48). On the other hand, the third fluid pressure passage 42 communicates with a right front holding solenoid valve 50 (hereinafter, referred to as SPRH 50), a left front holding solenoid valve 52 (hereinafter, referred to as SPLH 52) and a third assist solenoid valve 54 (hereinafter, referred to as SA-3 54).

The SFRH 50 is a two-position solenoid valve which maintains an open state in a normal state. The SFRH 50 communicates with the SA-1 46 and a right front wheel pressure decreasing solenoid valve 58 (hereinafter, referred to as SFRR 58) via a pressure adjusting fluid pressure passage 56. A check valve 60 permitting a fluid flow only in a direction from the pressure adjusting fluid pressure passage 56 to the third fluid pressure passage 42 is provided, in parallel, between the third fluid pressure passage 42 and the pressure adjusting fluid pressure passage 56.

The SA-1 46 is a two-position solenoid valve which selectively renders one of the first fluid pressure passage 36 and the pressure adjusting fluid pressure passage 56 to be communicated with the wheel cylinder 44FR, and renders the first fluid pressure passage 36 and the wheel cylinder 44FR to be in a communicating state in a normal state (OFF state). On the other hand, the SFRR 58 is a two-position solenoid valve which renders the pressure adjusting fluid pressure passage 56 and the reservoir tank 16 to be in a connected state or a disconnected state. The SFRR 58 renders the pressure adjusting fluid pressure passage 56 and the reservoir tank 16 to be in a disconnected state in a normal state (OFF state).

The SFLH 52 is a two-position solenoid valve which maintains an open state in a normal state. The SFLH 52 communicates with the SA-2 48 and a left front wheel pressure decreasing solenoid valve 64 (hereinafter, referred to as SFLR 64) via a pressure adjusting fluid pressure passage 62. A check valve 66 permitting a fluid flow only in a direction from the pressure adjusting fluid pressure passage 62 to the third fluid pressure passage 42 is provided, in parallel, between the third fluid pressure passage 42 and the pressure adjusting fluid pressure passage 62.

The SA-2 48 is a two-position solenoid valve which selectively renders one of the first fluid pressure passage 36 and the pressure adjusting fluid pressure passage 62 to be communicated with the wheel cylinder 44FL, and renders the first fluid pressure passage 36 and the wheel cylinder 44FL to be in a communicating state in a normal state (OFF state). On the other hand, the SFLR 64 is a two-position solenoid valve which renders the pressure adjusting fluid pressure passage 62 and the reservoir tank 16 to be in a connected state or a disconnected state. The SFLR 64 renders the pressure adjusting fluid pressure passage 62 and the reservoir tank 16 to be in a disconnected state from each other in a normal state (OFF state).

The second fluid pressure passage 38 communicates with the above-mentioned SA-3 54. The downstream side of the SA-3 54 communicates with a right rear wheel holding solenoid valve 68 (hereinafter, referred to as SRRH 68) provided in correspondence with a wheel cylinder 44RR of the right rear wheel RR and a left rear wheel holding solenoid valve 70 (hereinafter, referred to as SRLR 70) provided in correspondence with a wheel cylinder 44RL of the left rear wheel RL. The SA-3 54 is a two-position solenoid valve which selectively selectively renders one of the second fluid pressure passage 38 and the third fluid pressure passage 42 to be communicated with the SRRH 68 and the SRLR 70, and renders the second fluid pressure passage 38, the SRRH 68 and the SRLR 70 in a communicating state in a normal state (OFF state).

The downstream side of the SRRH 68 communicates with the wheel cylinder 44RR and a right rear wheel pressure decreasing solenoid valve 74 (hereinafter, referred to as SRRR 74) via a pressure adjusting fluid pressure passage 72. The SRRR 74 is a two-position solenoid valve which renders the pressure adjusting fluid pressure passage 72 and the reservoir tank 16 in a communicating state or a disconnected state, and renders the pressure adjusting fluid pressure passage 72 and the reservoir tank 16 in the disconnected state in a normal state (OFF state). Additionally, a check valve 76 permitting a fluid flow only in a direction from the pressure adjusting fluid pressure passage 72 to the SA-3 54 is provided, in parallel, between the SA-3 54 and the pressure adjusting fluid pressure passage 72.

Similarly, the downstream side of the SRLH 70 communicates with the wheel cylinder 44RL and a left rear wheel pressure decreasing solenoid valve 80 (hereinafter, referred to as SRLR 80) via a pressure adjusting fluid pressure passage 78 and the reservoir tank 16 in a communicating state or a disconnected state, and renders the pressure adjusting fluid pressure passage 78 and the reservoir tank 16 in the disconnected state in a normal state (OFF state). Additionally, a check valve 82 permitting a fluid flow only in a direction from the pressure adjusting fluid pressure passage 78 to the SA-3 54 is provided, in parallel, between the SA-3 54 and the pressure adjusting fluid pressure passage 78.

In the system according to the present embodiment, a brake switch 84 is provided near the brake pedal 30. The brake switch 84 is a switch that generates an ON output when the brake pedal 30 is pressed. The output signal of the brake switch 84 is supplied to the ECU 10. The ECU 10 determines whether or not a braking operation is performed by the driver based on the output signal of the brake switch 84.

Additionally, in the system according to the present embodiment, wheel velocity sensors 86FL, 86FR, 86RL and 86RR (hereinafter, these are referred to as 86 as a whole) are provided near the left and right front wheels FL and FR and the left and right rear wheels RL and RR, each of the sensors generating a pulse signal when the respective wheel rotates a predetermined angle. The output signals of the wheel velocity sensors 86 are supplied to the ECU 10. The ECU 10 detects a wheel velocity of each of the wheels FL, PR, RL and RR based on the output signals of the wheel velocity sensors 86**.

The ECU 10 supplies, if necessary, drive signals to the above-mentioned STR 26, SA-1 46, SA-2 48, SA-3 54, SFRH 50, SFLH 52, SFRR 58, SFLR 64, SRRH 68, SRLH 70, SRRR 74 and SRLR 80 based on the output signal of the brake switch 84.

A description will now be given of an operation of the brake force control apparatus according to the present embodiment, The brake force control apparatus according to the present embodiment performs the normal control for generating a brake force corresponding to the brake pressing force FP exerted on the brake pedal 30 when the vehicle is in a stable state. The normal control can be achieved, as shown in FIG. 1, by turning off all of the STR 26, SA-1 46, SA-2 48, SA-3 54, SFRH 50, SFLH 52, SFRR 58, SFLR 64, SRRH 68 SRLH 70, SRRR 74 and SRLR 80 based on the output signal of the brake signal 84.

That is, in the state shown in FIG. 1, the wheel cylinders 44FR and 44FL communicate with the first fluid pressure passage 36, and the wheel cylinders 44RR and 44RL communicate with the second fluid pressure passage 38. In this case, the brake fluid flows between the master cylinder 32 and the wheel cylinders 44FR, 44FL, 44RL and 44RR (hereinafter, these may be referred to as ** as a whole), and a brake force corresponding to the brake pressing force FP is generated in each of the wheels FL, FR, RL and RR.

In the present embodiment, when a possibility for shifting to a locked state is detected in one of the wheels, it is determined that a condition for performing an antilock brake control (hereinafter, referred to as ABS control) is established. The ECU 10 calculates wheel velocities VWFL, VWFR, VWRL and VWRR (hereinafter, these are referred to as VW as a whole) of the wheels based on output signals of the wheel velocity sensors 86, and calculates an assumed value VSO (hereinafter, referred to as an assumed vehicle velocity VSO) of the velocity of the vehicle according to a publicity known method. Then, when the vehicle is in a braking state, a slip rate S of each wheel is calculated according to the following equation so as to determine that the wheel may shift to a locked state when the slip rate S exceeds a predetermined value.

$$S = (VSO - VW^{**}) \cdot 100 / VSO \qquad \ldots (1)$$

When the condition for performing the ABS control is established, the ECU 10 outputs the drive signals to the SA-1 46, SA-2 48 and SA-3 54. As a result, when the SA-1 46 is turned on, the wheel cylinder 44FR is disconnected from the first fluid pressure passage 36 and connected to the pressure adjusting fluid pressure passage 56. Additionally, when the SA-2 48 is turned on, the wheel cylinder 44FL is disconnected from the first fluid pressure passage 36 and connected to the pressure adjusting fluid pressure passage 62. Further, when the SA-3 54 is turned on, the upstream side of the SRRH 68 and the SRLH 70 is disconnected from the second fluid pressure passage 38 and connected to the third fluid pressure passage 42.

In this case, all wheel cylinders 44 communicate with respective holding solenoid valves SFRH 50, SFLH 52, SRRH 68 and SRLH 70 (hereinafter, these are referred to as holding solenoid SH) and respective pressure decreasing solenoid valves SFRR 58, SFLR 64, SRRR 74 and SRLR 80 (hereinafter, these are referred to as pressure decreasing solenoid SH), and a regulator pressure PRE is introduced to the upstream side of each of the holding solenoids SH via the third fluid pressure passage 42 and the STR 26.

In the above-mentioned condition, a wheel cylinder pressure PW/C of the respective wheel cylinders 44 is increased with the regulator pressure PRE as an upper limit by the holding solenoids SH being in an open state and the pressure decreasing solenoids SR being in a closed state. Hereinafter, this state is referred to as a pressure increasing mode ①. Additionally, the wheel cylinder pressure PW/C of the respective wheel cylinders 44 is maintained without being increased or decreased by the holding solenoids SH being in a closed state and the pressure decreasing solenoids SR being in the closed state. Hereinafter, this state is referred to as a holding mode ②. Further, the wheel cylinder pressure PW/C of the respective wheel cylinders 44 is decreased by the holding solenoids SH being in the closed state and the pressure decreasing solenoids S**H being in the open state. Hereinafter, this state is referred to as a pressure decreasing mode ③. The ECU 10 achieves, if necessary, the above-mentioned pressure increasing mode ①, holding mode ② and pressure decreasing mode ③ so that a slip rate S of each wheel during a braking time becomes an appropriate value, that is, so that each wheel does not shift to the locked state.

When a depression of the brake pedal 30 is released by the driver during execution of the ABS control, the wheel cylinder pressure PW/C must be immediately decreased. In the system according to the present embodiment, the check valves 60, 66, 76 and 82 are provided in hydraulic pressure paths corresponding to each of the wheel cylinders 44, each of the check valves 60, 66, 76 and 82 permitting a fluid flow only in the directions from the wheel cylinders 44 to the third fluid pressure passage 42. Thus, according to the system of the present embodiment, the wheel cylinder pressures PW/C of all of the wheel cylinders 44 can be immediately decreased after the depression of the brake pedal 30** is released.

In the system according to the present embodiment, when the ABS control is performed, the wheel cylinder pressure PW/C is increased by the brake fluid being supplied from the regulator 24 to the wheel cylinders 44\*\*, that is, by the brake fluid being supplied from the pump 12 to the wheel cylinders 44\*\*, and is decreased by the brake fluid in the wheel cylinders 44\*\* flowing to the reservoir tank 16. When the increase in the wheel cylinder pressure PW/C is performed by using the master cylinder 32 as a fluid pressure source and if the pressure increasing mode and the pressure decreasing mode are repeatedly performed, the brake fluid in the master cylinder 32 gradually decreases and a so-called bottoming of the master cylinder may occur.

On the other hand, if the pump 12 is used as a fluid pressure source so as to increase the wheel cylinder pressure PW/C, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABS control, as a precondition, a braking operation having a level at which a large slip rate S is generated in one of the wheels must be performed.

Figure 2:
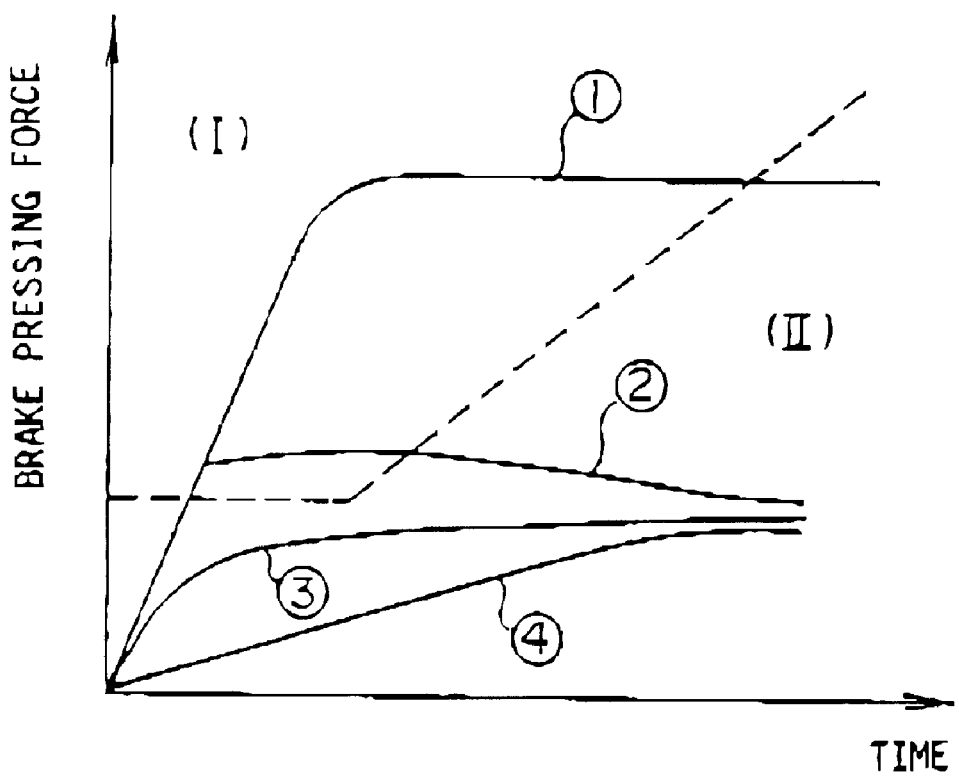
FIG. 2 is an illustration for showing a change in a brake pressing force achieved under various circumstances.

FIG. 2 shows changes in the brake pressing force FP applied to the brake pedal 30 with respect to time under various conditions. Curves indicated by ① and ② in FIG. 2 represent changes in the pressing force FP when an emergency braking is performed by a highly skilled driver (hereinafter, referred to as a high-grade driver) and an unskilled driver or a driver lacking (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force FP is immediately and rapidly increased in response to establishment of a condition in which an emergency braking is required, and a large brake pressing force FP can be maintained for a long time. If such a brake pressing force FP is exerted on the brake pedal 30, a sufficiently high brake fluid pressure can be provided from the master cylinder 32 to each of the wheel cylinders 44\*\* so as to start the ABS control.

However, as shown by the curve ② when the driver of the vehicle is a beginner-grade driver, the brake pressing force FP may not be increased to a sufficiently high value in response to the condition in which an emergency braking is required. If the brake pressing force FP exerted on the brake pedal 30 is not sufficiently increased as shown by the curve ② after an emergency braking is required, the wheel cylinder pressure PW/C in each of the wheels 44\*\* is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure PW/C even if the brake pressing force FP is not sufficiently increased when the brake pedal is operated with an intention to perform an emergency braking. Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force FP when the driver operates the brake pedal with an intention to perform a normal braking operation under various conditions. As shown by the curves ① to ④, a change in the brake pressing force FP associated with the normal braking operation is gentle as compared to a change in the brake pressing force FP associated with an emergency braking operation. Additionally, a convergent value of the brake pressing force FP associated with the normal braking operation is not so large as a convergent value of the brake pressing force FP associated with an emergency braking operation.

Giving attention to those differences, when the brake pressing force FP is increased to a sufficiently large value at a rate of change exceeding a predetermined value after a braking operation is started, that is, when the brake pedal 30 is operated so that the brake pressing force FP reaches an area indicated by (I) in FIG. 2, it can be determined that an emergency braking is performed.

Additionally, when the rate of change of the brake pressing force FP is smaller than the predetermined value or when the convergent value of the brake pressing force FP is smaller than the predetermined value, that is, when the brake pedal 30 is operated so that the brake pressing force FP always changes within an area indicated by (II) in FIG. 2, it can be determined that a normal braking operation is performed.

Accordingly, in the system according to the present embodiment, an operational speed and an amount of operation of the brake pedal are detected or assumed, and, then, it is determined whether or not the operational speed exceeds a predetermined value and whether or not the amount of operation exceeds a predetermined value, and, thereby, it can be determined whether or not the operation on the brake pedal 30 is intended to perform an emergency braking.

In the present embodiment, the speed and magnitude of the operation of the brake pedal 30 are detected as a parameter that is the master cylinder pressure $P_{M/C}$ detected by the hydraulic pressure sensor 40 (hereinafter the parameter used for this application is referred to as a basic parameter). The master cylinder pressure $P_{M/C}$ indicates a value based on the magnitude of the operation of the brake pedal 30, and varies with a variation ratio $P_{M/C}$ based on the operation speed of the brake pedal 30. Hence, according to the apparatus of the present embodiment, when the braking operation is performed by the driver, it is possible to precisely determine whether the operation is an emergency operation or normal braking operation.

A description will be given of an operation of the system according to the embodiment in a case where it is determined an emergency braking is performed by the ECU 10. The ECU 10 determines that an emergency braking is performed when the master cylinder pressure $P_{M/C}$ that has a value greater than a predetermined value is detected and the variation ratio $\Delta P_{M/C}$ that has a value greater than a predetermined value is detected after the brake pedal 30 is pressed. When it is determined that the emergency braking is performed, the ECU 10 sends a drive signal to the STR 26, SA-1 46, SA-2 48 and SA-3 54.

When the STR 26 is turned ON in response to the above drive signal, the third fluid pressure passage 42 and the high-pressure 22 are joined together. In this case, an accumulator pressure $P_{ACC}$ is introduced into the third fluid pressure passage 42. When the SA-1 46 and SA-2 48 are turned on in response to the drive signal, the wheel cylinders 44FR and 44FL are jointed to the pressure-adjusting fluid pressure passages 56 and 62, respectively. Further, when the SA-3 54 is turned ON, the upstream portions of the SRRH 68 and SRLH 70 are jointed to the third fluid pressure passage 42. In this case, a state is formed in which all the wheel cylinders 44 are jointed to the respective holding solenoids SH and the pressure decreasing solenoids SR, and the accumulator pressure $P_{ACC}$ is introduced into the upstream portions of all the holding solenoids SH.

In the ECU 10, immediately after the execution of the emergency braking is detected, all the holding solenoids SH and all the pressure decreasing solenoids SR are maintained in the OFF state. Hence, as described above, when the accumulator pressure $P_{ACC}$ is introduced into the upstream portions of the holding solenoids SH, the fluid pressure is supplied to the wheel cylinders 44** as it is. Hence, the wheel cylinder pressure $P_{W/C}$ of all the wheel cylinders 44**** is increased toward the accumulator pressure $P_{ACC}$.

As described above, according to the system of the present embodiment, when the emergency braking is performed, the wheel cylinder pressure $P_{W/C}$ of all the wheel cylinders 44** can rapidly be increased irrespective of the magnitude of the brake pressing force $F_P$. Hence, according to the system of the present invention, even if the driver is a beginner-grade driver, a large braking force can rapidly be produced after a situation necessary or an emergency braking occurs.

When the accumulator pressure $P_{ACC}$ is started to be applied to the wheel cylinders 44 , the slip ratios S of the wheels FL, FR, RL and RR are abruptly increased, and then the condition for execution of the ABS control stands. When the condition for execution of the ABS control is satisfied, the ECU 10** realizes ① the pressure increasing mode, ② holding mode and ③ pressure decreasing mode so that the slip ratios of all the wheels fall within an appropriate range, that is, all the wheels are not prevented from being locked.

If the ABS control is executed after the above-mentioned brake assist control, the wheel cylinder pressure $P_{W/C}$ is increased so that the brake fluid is supplied to the wheel cylinders 44 from the pump 12 and the accumulator 20. Thus, even if the pressure-increasing mode and the pressure-decreasing mode are alternately performed, so that the so-called bottoming of the master cylinder 32** may not occur.

When the emergency braking is performed and thus the brake assist control is executed, it is required to terminate the brake assist control when the brake pedal 30 is released from the pressed state. In the system of the present embodiment, the STR 26, SA-1 46, SA-2 48 and SA-3 54 are maintained in the ON states as have been described. In the case where the STR 26, SA-1 46, SA-2 48 and SA-3 54 are maintained in the ON state, the fluid pressure chamber within the regulator 24 and the first and second fluid pressure chambers 32a and 32b of the master cylinder 32 are substantially closed spaces.

Under the above situation, the master cylinder pressure $P_{M/C}$ has a value dependent on the brake pressing force $F_P$. Hence, the EUC 10 monitors the output signal of the master cylinder pressure $P_{M/C}$ sensed by the hydraulic pressure sensor 40, and easily determines whether the brake pedal 30 is released form the pressed state. When it is sensed that the brake pedal 30 is released from the pressed state, the ECU 10 stops supplying the STR 26, SA-1 46 and SA-2 48 with the drive signals, and thus realizes the executing state of the normal control.

By the way, the brake force control apparatus of the present embodiment, it is determined that the emergency braking is performed when the master cylinder pressure $P_{M/C}$ higher than a predetermined value is detected and the variation ratio $\Delta P_{M/C}$ higher than a predetermined value is detected. Besides the situation in which the driver intentionally performs the emergency braking, the variation ratio $\Delta P_{M/C}$ will have a value greater than that obtained at the normal state if the vehicle is traveling on a rough road with a foot placed on the brake pedal 30 or if the vehicle is riding over a step with a foot placed on the brake pedal 30.

That is, the variation ratio $\Delta P_{M/C}$ will temporarily have a great value if the vehicle is traveling on a rough road or riding over a step although the driver does not intend to perform the emergency braking. Hence, through the emergency braking is not actually performed, the emergency braking may erroneously be detected when the vehicle is traveling on a rough road or riding a step if a decision as to whether the emergency braking is performed is made based on only the steps of determining whether the master cylinder pressure $P_{M/C}$ higher than the predetermined value takes place and determining whether the variation ratio $\Delta P_{M/C}$ greater than the predetermined value takes place.

Figure 3A:
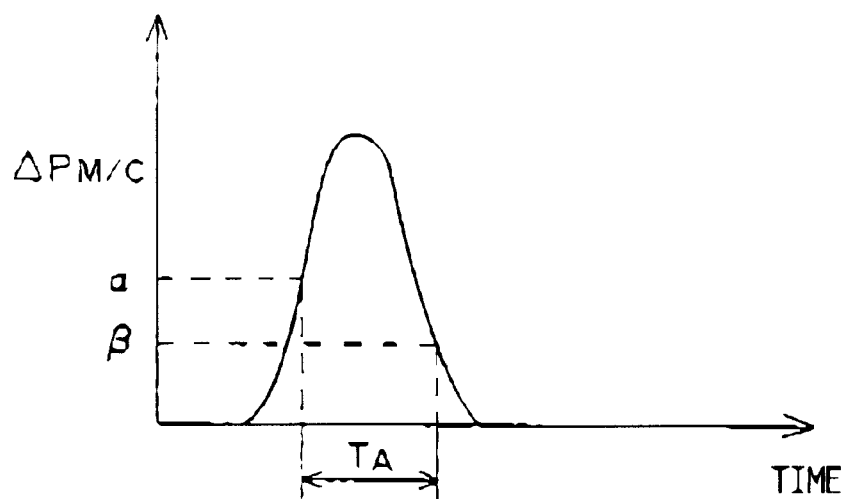
FIG. 3(A) is a diagram showing a change in a variation ratio ΔPM/C of the master cylinder pressure PM/C observed when an emergency braking is performed by a driver.
Figure 3B:
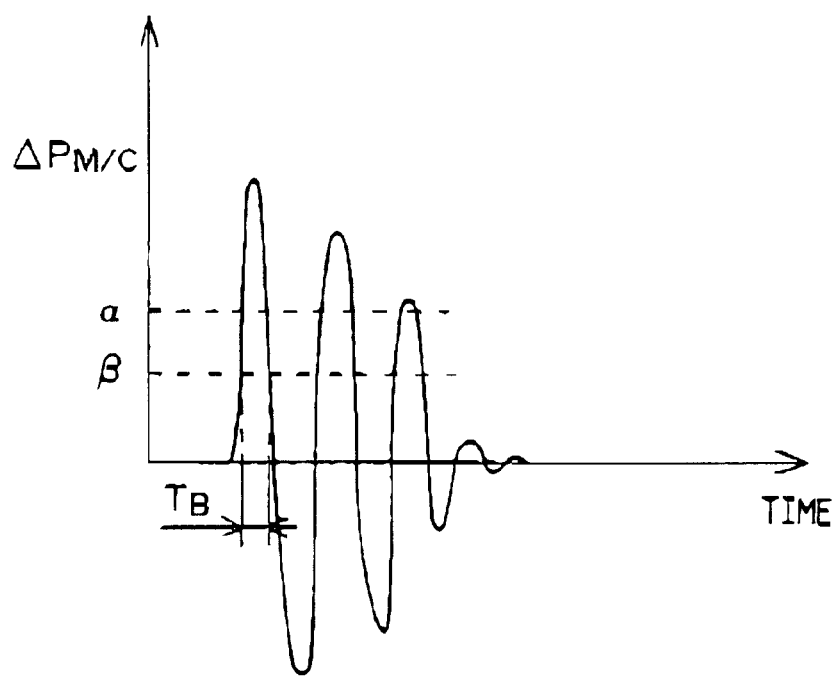
FIG. 3(B) is a diagram showing a change in a variation ration ΔPM/C of the master cylinder pressure PM/C observed when an emergency braking is performed due to an external turbulence.

FIG. 3(A) shows a variation in the variation ratio $\Delta P_{M/C}$ observed when the driver intends to perform the emergency braking and actually depresses the brake pedal 30. FIG. 3(B) shows a variation in the variation ratio $\Delta P_{M/C}$ observed when the brake pedal 30 is pressed due to a vibration of the vehicle which is traveling on a rough road. As shown in FIGS. 3(A) and 3(B), if the brake pedal 30 is pressed due to an external turbulence such as a vibration of the vehicle, the variation ratio $\Delta P_{M/C}$ is changed at frequencies higher than those obtained when the driver intends to perform the emergency braking and presses the brake pedal 30.

Hence, if there is a great change in the variation ratio $\Delta P_{M/C}$, it is possible to precisely determined whether the great change results from the driver's intention or an external turbulence such as a rough round by referring to the increasing/decreasing frequency of the variation ratio $\Delta P_{M/C}$. More particularly, measured is the time it takes for the variation ratio $\Delta P_{M/C}$ to exceed a first threshold value α and becomes equal to or less than a second threshold value β (which corresponds to time $T_A$ shown in FIG. 3A and time $T_B$ shown in FIG. 3B). The time thus measured is compared with a decision time $T_1$, and it is thus possible to determine whether or not the change in the variation ratio $\Delta P_{M/C}$ results from the driver's intention.

When it is possible to determine whether the variation ratio $\Delta P_{M/C}$ results from the driver's intention or an external turbulence such as a rough road, the brake assist control is permitted to be executed only when the detected variation ratio $\Delta P_{M/C}$ results from the intentional operation. By executing the brake assist control only when the variation ratio $\Delta P_{M/C}$ results from the intentional operation, it is possible to realize good brake feeling which does not make the driver uncomfortable.

Also, a large change in the variation ratio $\Delta P_{M/C}$ due to an external turbulence occurs when the vehicle is vibrated due to a rough road or a step. Hence, it is possible to prevent the brake assist control from being executed and the brake feeling from being degraded by inhibiting the brake assist control from being executed in a case where the vehicle is traveling on a rough road, a case where the vehicle is passing a step or a case where a large vibration occurs in the vehicle.

Thus, according to the brake force control apparatus of the present embodiment, the brake assist control is inhibited from being executed ① if the time it takes for the variation ratio $\Delta P_{M/C}$ to exceed the first threshold value $\alpha$ and becomes equal to or less than the second threshold value $\beta$ is shorter than the predetermined time $T_1$, ② if the vehicle is traveling on a rough road, or ③ if the vehicle is passing a step. Now, a description will now be given, with reference to FIGS. 4 through 7, of a process executed in the brake force control apparatus directed to realizing the above-mentioned functions.

Figure 4:
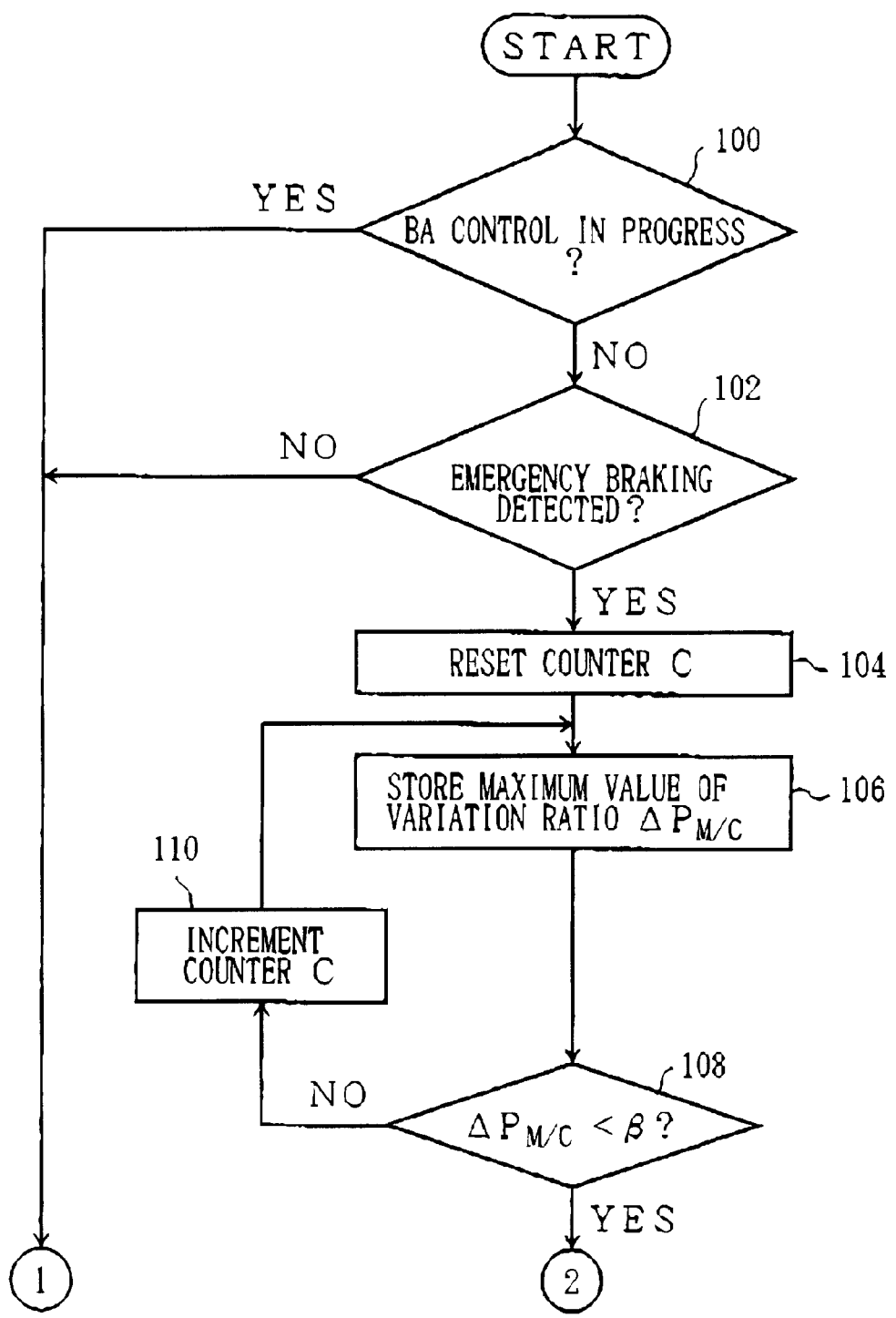
FIG. 4 is a flowchart of a control routine executed in a brake force control apparatus according to a first embodiment of the present invention (part 1)
Figure 5:
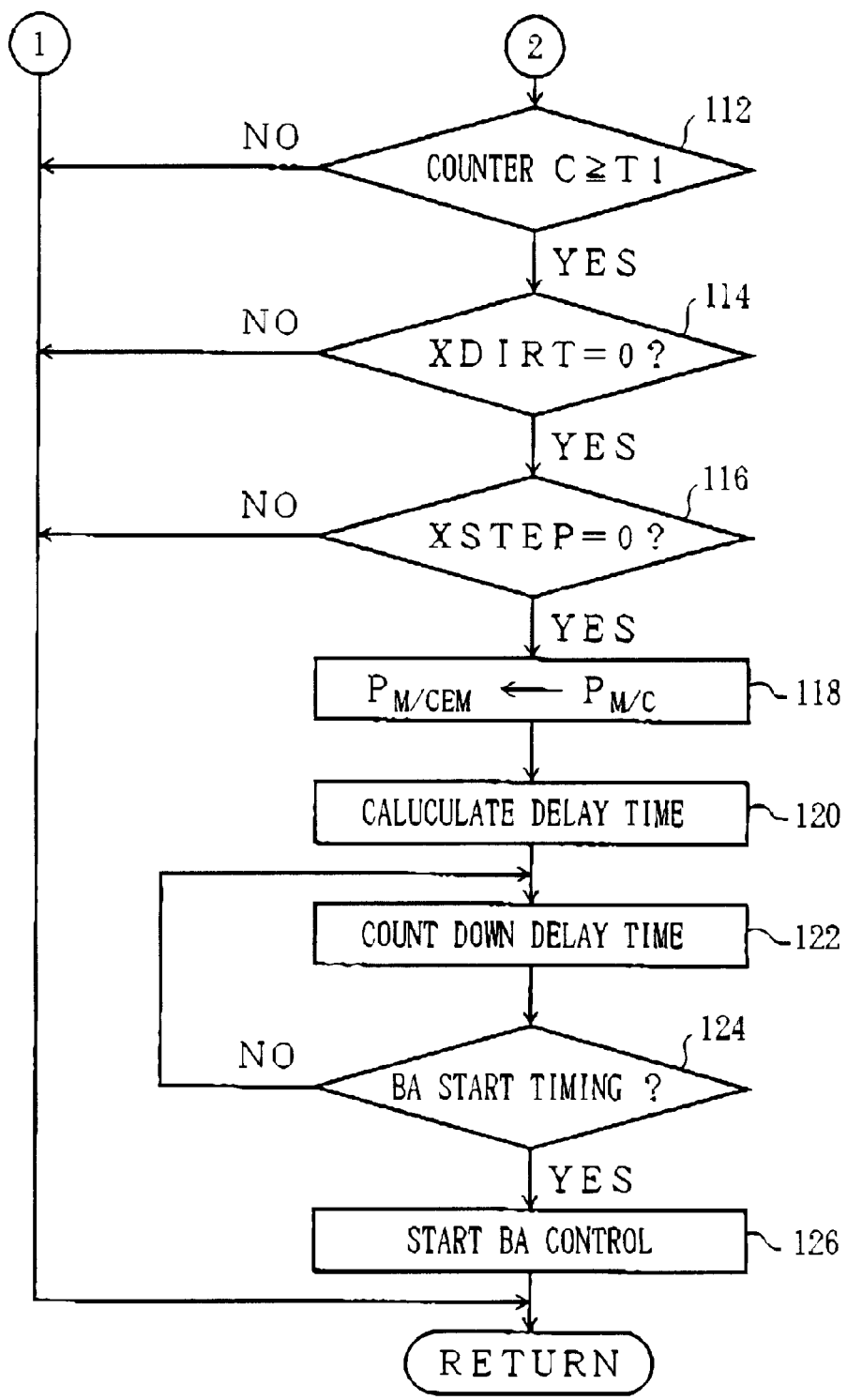
FIG. 5 is a flowchart of the control routine executed in a brake force control apparatus according to the first embodiment of the present invention (part 2)

FIGS. 4 and 5 are respectively flowcharts of an example of a control routine for determining whether the brake assist control should be executed by the ECU 10. When the present routine is activated, a process of step 100 shown in FIG. 4 is executed.

At step 100, it is determined whether the brake assist control is being executed. The present route is a routine that is executed in order to determine whether the brake assist control is permitted to be executed. Hence, if it is determined that the brake assist control has already been started, the routine in progress is ended. In contrast, if it is determined that the brake assist control is not being executed, a process of step 102 is executed.

At step 102, it is determined whether execution of the emergency braking is detected. More particularly, it is determined whether a situation occurs in which the ON output is issued by the brake switch 84 and both $P_{M/C} > P_0$ and $\Delta P_{M/C} > \alpha$. In the above condition, "$P_0$" is the first threshold value defined with respect to the variation ratio $\Delta P_{M/C}$ in order to determine whether the emergency braking is performed.

If it is determined, at step 102, that the emergency braking is not executed, the routine in progress is ended without execution of any process. In contrast, it is determined that the emergency braking has been executed, a process of step 104 is executed.

At step 104, a counter C is reset. As will be described later, the counter C is used to measure the time it takes for the variation ratio $\Delta P_{M/C}$ to exceed the first threshold value $\alpha$ and then becomes equal to or less than the second threshold value $\beta$. When the above process ends, a process of step 106 is executed.

At step 106, a process is executed which stores a maximum value $MAX\Delta P_{M/C}$ of the variation ratio $\Delta P_{M/C}$ caused in the master cylinder pressure $P_{M/C}$. More particularly, a process is executed so that, if the variation ratio $\Delta P_{M/C}$ detected in the execution of this time is greater than the value stored as the maximum value $MAX\Delta P_{M/C}$ in the previous execution, the value detected this time is stored as the maximum value $MAX\Delta P_{M/C}$. When the process of step 106 ends, a process of step 108 is executed.

At step 108, it is determined whether the variation ratio $\Delta P_{M/C}$ of the master cylinder pressure $P_{M/C}$ is less than the second threshold value $\beta$, that is, whether the degree of increasing of the master cylinder pressure $P_{M/C}$ becomes gentle. If it is determined that $\Delta P_{M/C} < \beta$, a process of step 110 is executed.

At step 110, a process of incrementing the counter C is executed. When the process of step 110 ends, the process of step 106 is executed again. The process of steps 106–110 is repeatedly carried out until the condition of step 108 is satisfied. When it is determined at step 108 that the condition $\Delta P_{M/C} < \beta$ is satisfied, a process of step 112 shown in FIG. 5 is executed.

According to the above process, at the time when the condition $\Delta P_{M/C} < \beta$ is satisfied, the largest value of the variation ratio $\Delta P_{M/C}$ obtained before the above time can be stored as the maximum value $MAX\Delta P_{M/C}$. Further, it is possible to calculate, by using the counter C, the time it takes for the variation ratio $\Delta P_{M/C}$ to exceed the first threshold value $\alpha$ and becomes equal to or less than the second threshold value $\beta$. In the present routine, the first threshold value $\alpha$ and the second threshold value $\beta$ are selected so that a relationship $\alpha > \beta$ is satisfied. Alternatively, it is possible to select the first threshold value $\alpha$ and the second threshold value $\beta$ so that a relationship $\alpha \beta$ is satisfied.

At step 112, it is determined whether or not the count value of the counter C is equal to or greater than the predetermined time $T_1$. The predetermined time $T_1$ is much shorter than the time detected when the driver intentionally performs the emergency braking. Also, the predetermined time $T_1$ may be detected when the brake pedal 30 is depressed due to an external turbulence such as a rough road or a step on the road.

Hence, when it is determined that $C T_1$ is not satisfied, that is, when the frequency of the variation ratio $\Delta P_{M/C}$ is comparatively high, it can be determined that the detected emergency braking results from an external turbulence such as a rough road or a step. In this case, the present execution of the routine is ended without execution of any process. In contrast, if it is determined that $C T_1$ is satisfied, it is determined that the detected emergency braking results from the emergency braking operation performed by the driver. In this case, in order to start the brake assist control, a process of step 114 is executed.

At step 114, it is determined whether or not a rough road decision flag XDIRT is reset to "0", that is, whether or not the road on which the vehicle is traveling has been determined as being rough. The rough road decision flag XDIRT is a flag which is set to "1" when a comparatively large vehicle vibration is continuously detected for a given period. The rough road decision flag XDIRT is processed so that the ECU10 executes the subroutine shown in FIG. 6 as will be described later.

When it is determined at step 114 that DXIRT="0" is satisfied, it can be determined that the rough on which the vehicle is traveling is not rough. In this case, a process of step 116 is executed in order to determine whether execution of the brake assist control is permitted.

In contrast, if it is determined at step 114 that XDIRT="0" does not stand, that is, the road on which the vehicle is traveling is rough, the routine in progress is ended without executing any process. Hence, according to the brake force control apparatus of the present embodiment, it is possible to prevent the brake assist control from being unnecessarily executed when the brake pedal 30 is operated at a high speed due to a vibration of the vehicle which is traveling on a rough road.

At step 116, it is determined whether a step decision flat XSREP is reset to "0", that is, whether the vehicle is not traveling on a step. The step decision flag XSERP is a flag which is set to "1" only a given period starting with the timing when it is estimated that the front wheels FL and FR of the vehicle reach a step. In the present embodiment, the step decision flag XSERP is processed so that the ECU 10 executes a subroutine shown in FIG. 7, as will be described later.

When it is determined at step 116 that XSTEP="0" stands, it is possible to determine that the vehicle is not traveling on a step. In this case, the process starting with step 118 is executed in order to start the brake assist control.

When it is determined at step 116 that XSTEP="0" does not stand, that is, when the vehicle is passing a step, the routine in progress is ended without executing any process. Hence, according to the brake force control apparatus, it is possible to prevent the brake assist control from being unnecessarily executed when the vehicle is riding over a step and thus the brake pedal 30 is operated at a high speed.

In the present routine, the decisions of steps 112–116 are made immediately after the condition of step 108 stands. The condition of step 108 stands when the master cylinder pressure $P_{M/C}$ is rapidly boosted and then starts to be settled to an appropriate fluid pressure based on the brake pressing force.

When the master cylinder pressure $P_{M/C}$ is rapidly increased, the difference between the master cylinder pressure $P_{M/C}$ and the wheel cylinder pressure $P_{W/C}$ occurs. Hence, at the time when the decisions of steps 112 to 116 stand, a certain difference occurs between the master cylinder pressure $P_{M/C}$ and the wheel cylinder pressure $P_{W/C}$. Hereinafter, the above differential pressure will be referred to as an emergency braking time differential pressure $\Delta P_{EM}$.

If there is a large differential pressure between the master cylinder pressure $P_{M/C}$ and the wheel cylinder pressure $P_{W/C}$, it is possible to rapidly increase the wheel cylinder pressure $P_{W/C}$ by using the master cylinder 32 as the fluid pressure source, as compared to the case where the pump 12 and the accumulator 20 are used as the fluid pressure source. Hence, it is preferable, after the conditions of the steps 112–116 stand, the brake assist control is not started until the differential pressure between the master cylinder pressure $P_{M/C}$ and the wheel cylinder pressure $P_{W/C}$ becomes a certain small level.

The time during which the brake assist control should not be executed after the conditions of the steps 112–116 stand (hereinafter the above time will be referred to as a delay time D) should be set longer as the emergency braking time differential pressure $\Delta P_{EM}$ is higher. The emergency braking time differential pressure $\Delta P_{EM}$ is higher as the maximum value $MAX\Delta P_{M/C}$ of the variation ratio $\Delta P_{M/C}$ is greater and as the master cylinder pressure $P_{M/C}$ obtained when the conditions of the steps 112–116 stand is higher. Hence, it is appropriate that the delay time D is set to be longer as the maximum value $MAX\Delta P_{M/C}$ is greater and as the emergency braking time master pressure $P_{M/CEM}$ is higher.

At step 118 of the present routine, the master cylinder pressure $P_{M/C}$ sensed by the hydraulic pressure sensor 40 at that time is stored as the emergency braking time master pressure $P_{M/CEM}$. When the process of step 118 ends, a process of step 120 is then executed.

At step 120, the delay time D is calculated based on the emergency braking time master pressure $P_{M/CEM}$ and the maximum value $MAX\Delta P_{M/C}$ of the variation ratio $\Delta P_{M/C}$. The delay time D is set, based on a map stored in the ECU 10 beforehand, to be longer, as the emergency braking time master pressure $P_{M/CEM}$ is higher and as the maximum value $MAX\Delta P_{M/C}$ of the variation ratio $\Delta P_{M/C}$ is greater. When the process of step 120 ends, a process of step 122 is executed.

At step 122, the down counting of the delay time D is performed. When the process of step 122 ends, a process of step 124 is executed.

At step 124, it is determined whether the start timing of the brake assist control comes. At step 124, it is determined that the time when the down counting of the delay time D is just completed is the start timing of the brake assist control. If the result of the above determination shows that the start timing does not come, the process of step 122 is executed again. In contrast, if it is determined that the start timing comes, a process of step 126 is executed.

At step 126, the process for starting the brake assist control is executed. When the process of step 126 ends, the routine in progress is ended. According to the above-mentioned process, when the driver performs the emergency braking, the wheel cylinder pressure $P_{W/C}$ having a large level to be applied to the wheels can rapidly be generated.

As described above, according to the brake assist control apparatus of the present embodiment, the brake assist control can be prevented from being executed, even when the master cylinder pressure $P_{M/C}$ and the variation ratio $\Delta P_{M/C}$ thereof satisfy the condition for permitting execution of the brake assist control, if it is estimated that they result from an external turbulence such as a rough road or a step. Hence, according to the brake assist control of the present embodiment, it is possible to definitely inhibit the brake assist control from being executed at an inappropriate time.

As described above, according to the brake assist control of the present embodiment, it is possible to prevent the brake assist control from being started when the vehicle is traveling on a rough road or passing a step and to rapidly increase the wheel cylinder pressure $P_{W/C}$ by starting the brake assist control at an appropriate time when the driver performs an emergency braking.

Figure 6:
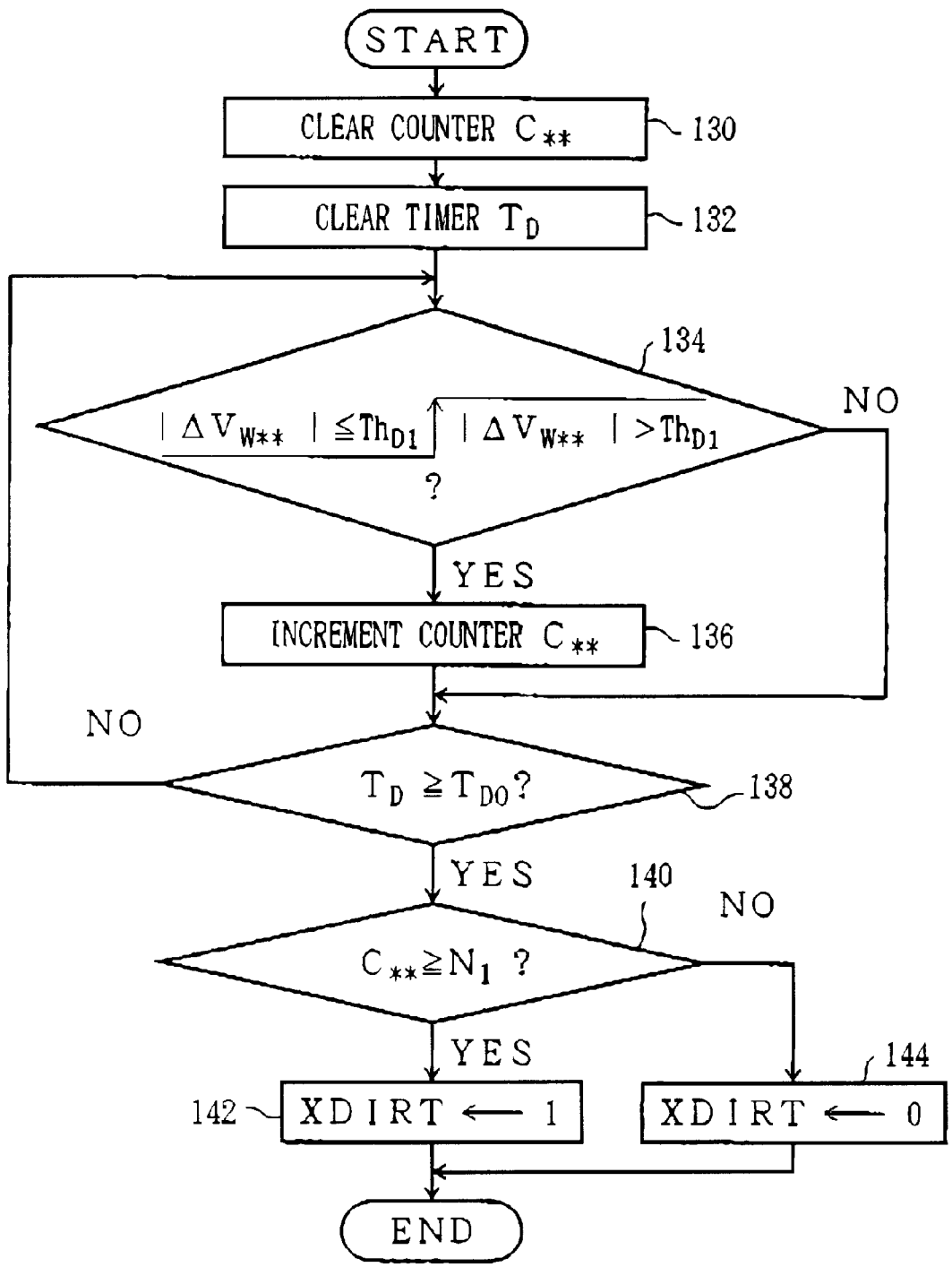
FIG. 6 is a flowchart of an example of a rough road decision routine executed in the brake force control apparatus according to the first embodiment of the present invention.

FIG. 6 is a flowchart of an example of a control routine executed by the ECU 10 in order to process the rough road decision flag XDIRT. The routine shown in FIG. 6 is a predetermined-time-based interruption routine that is activated every given time.

At step 130, counters CFL, CFR, CRL and CRR (hereinafter, a symbol C is used when these counters are referred to as a whole) respectively provided to the wheel velocity sensors 86 are cleared. When the above process ends, a step of 132 is executed.

At step 132, a timer $T_D$ is cleared. The time $T_D$ is a timer used to determined whether the sampling time elapses when determining whether or not the road on which the vehicle is traveling is rough. The time $T_D$ is cleared as described above, and is then incremented automatically. When the step of step 132 ends, a process of step 134 is executed.

At step 134, it is determined whether a variation of a wheel velocity $V_W$ per unit time (hereinafter referred to a variation ratio) $|\Delta V_W|$ changes from a value equal to or less than a threshold value $Th_{D1}$ to a value exceeding the threshold value $Th_{D1}$ between the last process cycle and the present process cycle. The threshold value $Th_{D1}$ is a value of the variation ratio $|\Delta V_W|$ which frequently occurs while the vehicle is traveling on a rough road. At the present step, if it is determined that a change in the variation ratio $|\Delta V_W|$ exceeding $Th_{D1}$ occurs, a process of step 136 is executed. In contrast, if it is determined that a change in the variation ratio $|\Delta V_W**|$ exceeding $Th_{D1}$ does not take place, step 136 is bypassed, and a process of step 138 is executed immediately.

At step 136, the counters C corresponding to the wheel velocity sensors 86 that detect a variation in the wheel velocities which satisfies the condition of step 134 are incremented. When the process of step 136 ends, a process of step 138 is executed.

At step 138, it is determined whether or not the count value of timer $T_D$ is equal to or greater than a given sampling time $T_{D0}$. If $T_D \geq T_{D0}$ does not stand, it is determined that the sampling time necessary to determine whether the road is rough has not yet elapsed. In this case, the process starting from step 134 is repeatedly carried out until it is determined that $T_D \geq T_{D0}$ stands. When $T_D \geq T_{D0}$ stands, a process of step 140 is executed. According to the above process, the counters C** count the number of times that a wheel velocity change exceeding the threshold value $Th_{D1}$ occurs in the respective wheels FL, FR, RL and RR occurs during $T_{D0}$.

At step 140, it is determined whether or not the count values of the counters $C^{}$ are equal to or greater than a predetermined value $N_1$. If $C^{}$ $N_1$ stands for any of the counters $C^{}$, it can be determined that a large variation frequently occurs in the corresponding wheel velocity $V_{W^{}}$. In this case, it is determined that the road on which the vehicle is traveling is rough, and a process of step 142 is executed.

At step 142, the rough road decision flag XDIRT is set to "1" in order to indicate that the vehicle traveling road is rough. When the process of step 142 ends, the routine in progress is ended.

In contrast, if it is determined at step 140 that $C^{}$ $N_1$ does not stand in any of the counters $C^{}$ at all, it can be determined that a large variation does not occur in any of the wheel velocities $V_{W^{}}$. In this case, it is determined that the road on which the vehicle is traveling is not rough, and a process of step 144** is executed.

At step 144, the rough road decision flag XDIRT is reset to "0" in order to indicate that the vehicle traveling road is not rough.

According to the above process, based on variations in the wheel velocities $V_{W^{}}$, it is possible to precisely determine whether the vehicle is traveling on a rough road. In the routine shown in FIG. 6, the rough road decision is made based on the wheel velocities $V_{W^{}}$ of all the wheels FL, FR, RL and RR. Alternatively, the rough road decision may be made based on any one of the well speeds $V_{W^{**}}$.

When the vehicle is equipped with an acceleration sensor that senses an acceleration exerted on the vehicle in the forward and backward directions or the upward and downward directions or stroke sensors that respectively sense the magnitudes of strokes of the wheels FL, FR, RL and RR, it may be possible to extract a variation about the resonance frequency of the vehicle (vibration of sprung) from the outputs of the sensors and determine whether or not the road on which the vehicle is traveling is rough by determining whether or not the level of the detected vibration is equal to or greater than a given level. Alternatively, it is possible to determine whether the road is rough by using a non-contact type sensor and directly detecting the condition of the road surface. As described above, the rough road decision making can be done by conventionally proposed various methods for detecting the vibrations of the vehicle and estimating the road surface condition.

Figure 7:
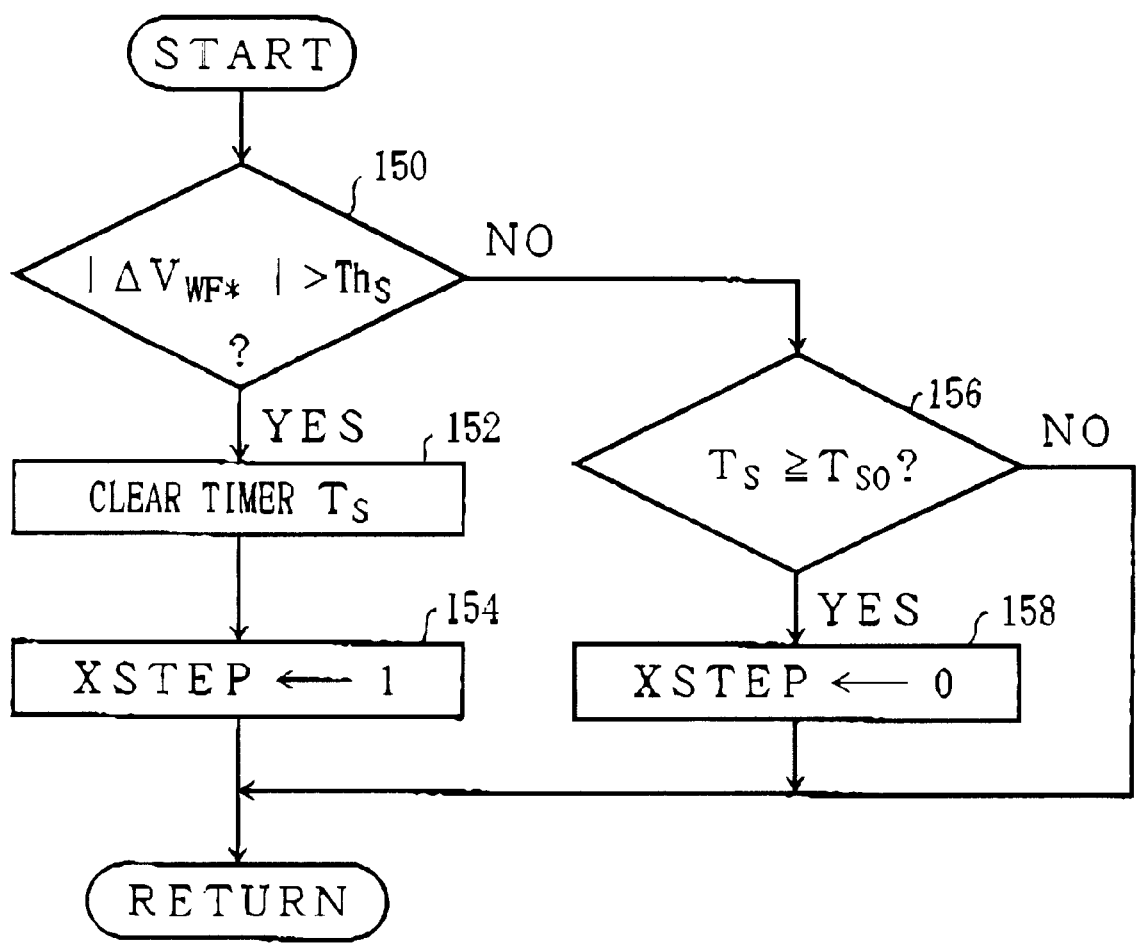
FIG. 7 is a flowchart of an example of a step decision routine executed in the brake force control apparatus according to the first embodiment of the present invention.

FIG. 7 is a flowchart of an example of a control routine executed by the ECU 10 in order to perform the process of the step decision flag XSTEP. The routine shown in FIG. 7 is a predetermined-time-based interruption routine that is activated every predetermined time. When the present routine is activated, a process of step 150 is executed first.

At step 150, it is determined whether or not variation ratios $|\Delta V_{WF^*}|$ of the wheel velocities $V_{WFL}$ and $V_{WFR}$ of the front left and right wheels FL and FR (hereinafter referred to as $V_{WF^*}$ as a whole) are greater than a threshold value $Th_s$. The threshold value $Th_s$ (>$Th_{D1}$) is a value of the variation ratio $|\Delta V_{WF^*}|$ generated when the wheel is passing a step. When it is determined that $|\Delta V_{WF^*}|$> $Th_s$ stands in either the front left wheel FL or the front right wheel FR, it is determined that the front wheels pass a step. In this case, a process of step 152 is executed.

At step 152, a timer $T_S$ is cleared. The timer $T_S$ is a timer that measures the passage time after the front wheels pass the step. The timer $T_S$ is cleared as described above, and is then incremented automatically. When the above process ends, a process of step 154 is executed.

At step 154, the step decision flag XSTEP is set to "1" in order to indicate that the vehicle is passing the step. When the process of step 154 ends, the present execution of the routine is ended.

In contrast, if it is determined at step 150 that $|\Delta V_{WF^{}}|$> $Th_s$ does not stand in the front left and right wheels FL and FR at all, a process of step 156** is executed.

At step 156, it is determined whether or not the measured value of the timer $T_S$, that is, the passage time after the step was detected most recently is equal to or longer than a predetermined time $T_{S0}$. The predetermined time $T_{S0}$ is slightly longer the time it takes for the rear wheels to reach the step after the front wheels passes the above step. Hence, if $T_S$ $T_{S0}$ does not stand yet, it can be determined that the rear wheels of the vehicle has passed the step which was detected most recently. In this case, the routine in progress is terminated without execution of any process. In contrast, if it is determined that $T_S$ $T_{S0}$ stands, it is possible to determined that the rear wheels RL and RR have passed the step which was detected most recently. In this case, a process of step 158 is executed.

At step 158, the step decision flag XSTEP is reset to "0" in order to show that the vehicle has passed the step. When the step 158 ends, the routine in progress is ended. According to the above process, it is possible to precisely determine whether the vehicle is passing a step on the basis of variations in the wheel velocities $V_{W^{**}}$.

By the way, in the routine shown in FIG. 7, the step decision is made based on the wheel velocities $V_{WF^{}}$ of the front left and right wheels FL and FR. However, the step decision making is limited to the above, but can be done based on the wheel velocity $V_{W^{}}$ of only one of the front left and right wheels FL and FR.

When the vehicle is equipped with an acceleration sensor that senses an acceleration exerted on the vehicle in the forward and backward directions or the upward and downward directions or stroke sensors that respectively sense the magnitudes of strokes of the wheels FL, FR, RL and RR, it may be possible to make the step decision from the outputs of the sensors. Alternatively, it is possible to make the step decision by using a non-contact type sensor and directly detecting the condition of the road surface. As described above, the step decision making can be done by conventionally proposed various methods for detecting the vibrations of the vehicle and estimating the road surface condition.

As described above, according to the brake force control apparatus of the present embodiment, it is determined, based on the master cylinder pressure $P_{M/C}$ and the variation ratio $\Delta P_{M/C}$ thereof, whether the braking performed by the driver is the emergency braking or the normal braking. Also, it is determined, based on the variation ratio $\Delta P_{M/C}$, whether the braking results from the driver's intention or an external turbulence. However, the parameters that base the above decisions are not limited to the master cylinder pressure $P_{M/C}$ and the variation ratio $\Delta P_{M/C}$ thereof.

That is, when the brake pedal 30 is operated, the brake pressing force $F_P$ exerted on the brake pedal 30 and the magnitude of stroke of the brake pedal 30 are varied in addition to variation in the master cylinder pressure $P_{M/C}$. Also, when the brake pedal 30 is operated and brake force is thus exerted on the vehicle, a deceleration G is generated on the vehicle. Hence, the discrimination over the emergency braking and the normal braking can be estimated based on, in addition to the aforementioned master cylinder pressure P<sub>MC</sub> ①, the brake pressing force F<sub>P</sub> ②, pedal stroke L ③, vehicle deceleration G ④, estimated vehicle velocity V<sub>S0</sub> ⑤, and the wheel velocity V<sub>W</sub>** ⑥.

A description will now be given, with reference to FIGS. 8 and 9, of a second embodiment of the present invention. A brake force control apparatus of the present invention is realized by having the ECU 10 execute control routines shown in FIGS. 8 and 9 instead of the control routines shown in FIGS. 4 and 5.

Figure 8:
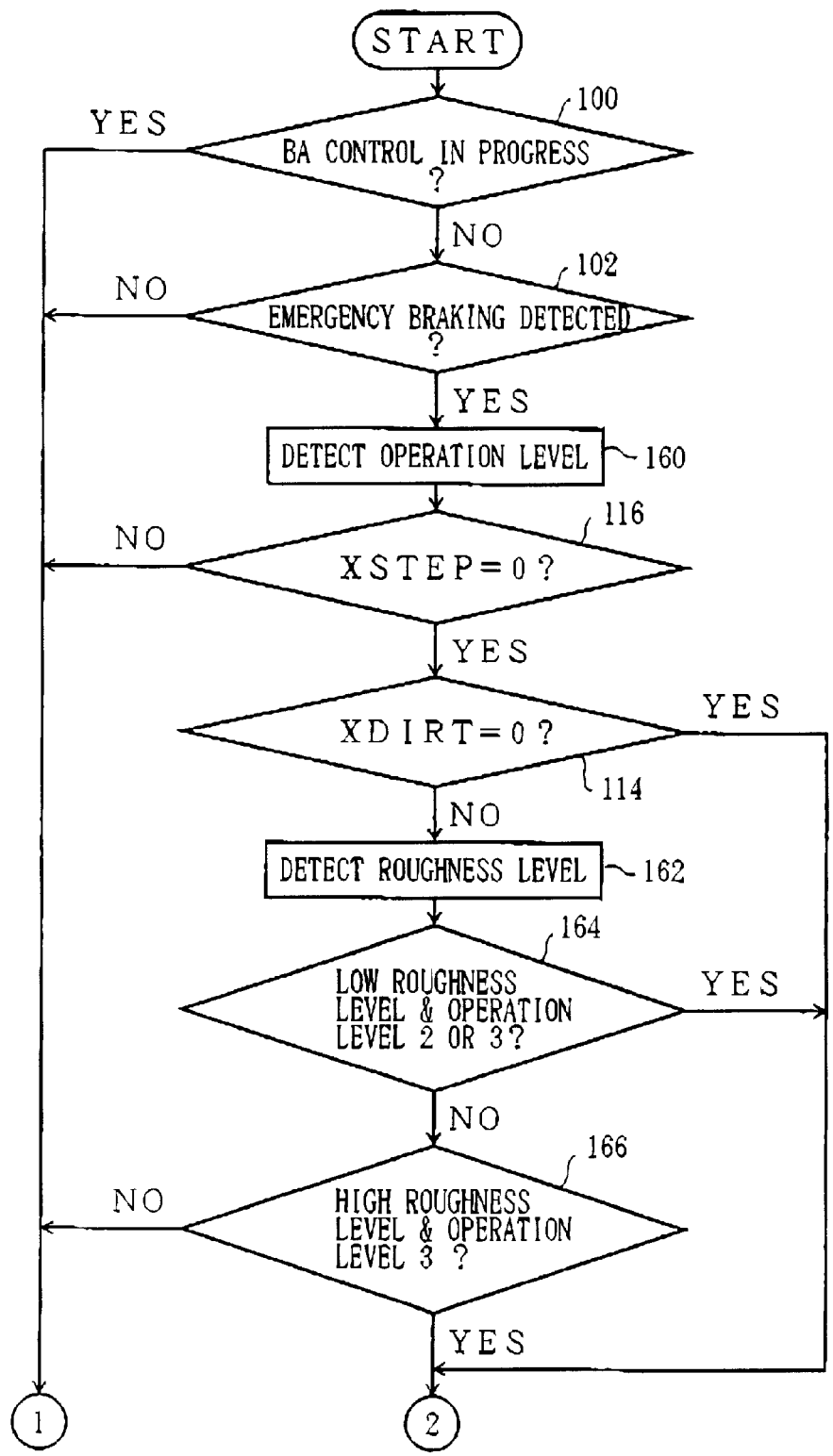
FIG. 8 is a flowchart of a control routine executed in a brake force control apparatus according to a second embodiment of the present invention (part 1)
Figure 9:
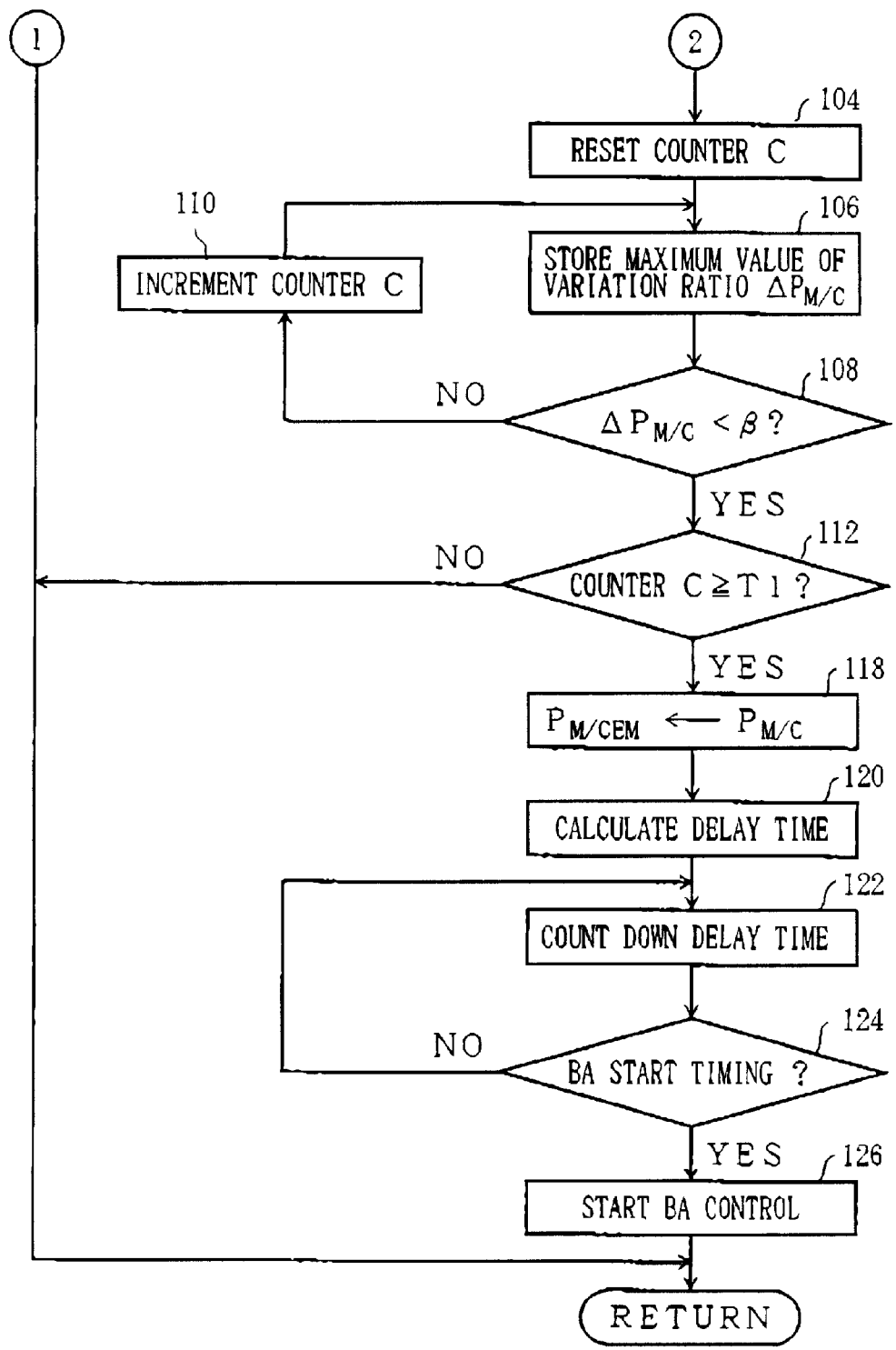
FIG. 9 is a flowchart of the control routine executed in a brake force control apparatus according to a second embodiment of the present invention (part 2)

FIGS. 8 and 9 is a flowchart of an example of a control routine executed by the ECU 10 and directed to eliminating an influence of an external turbulence such as a rough road or a step. In the routines shown in FIGS. 8 and 9, steps that are the same as those shown in FIGS. 4 and 5 are given the same reference numbers, and a description thereof will be omitted or given briefly.

According to the routines shown in FIGS. 8 and 9, a process of step 160 is executed when an emergency braking is detected (step 102) while the brake assist control is not executed (step 100).

At step 160, the degree of emergency of the emergency braking detected by the above step 102 (hereinafter referred to as an operation level) is detected.

Figure 10:
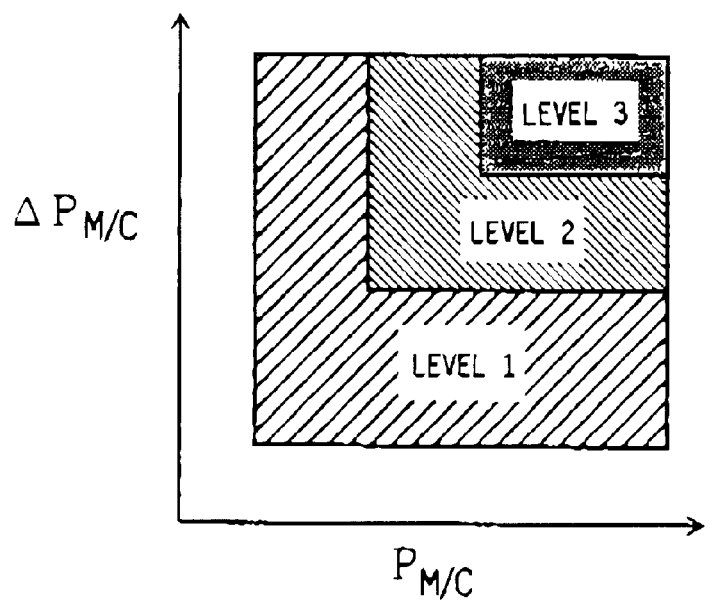
FIG. 10 shows an example of a map referred to when an operation level is detected in the control routine shown in FIGS. 8 and 9.

FIG. 10 shows a map that is referred to when the operation level is detected at the above step 160. At step 160, according to the map shown in FIG. 10, the operation level is set to "1" when the master cylinder pressure P<sub>M/C</sub> and the variation ratio ΔP<sub>M/C</sub> thereof are relatively small, that is, when the degree of emergency is not so high. Then, the operation level is set to "2" or "3" as the master cylinder pressure P<sub>M/C</sub> and the variation ratio ΔP<sub>M/C</sub> thereof increase.

In the present routine, when the process of step 160 ends, a process of step 116 is executed.

At step 116, it is determined whether or not the step decision flag XSTEP is equal to "0". If it is determined that XSTEP="0" does not stand, the routine in progress is terminated without execution of any process. In contrast, if it is determined that STEP="0" stands, a process of step 114 is executed.

At step 114, it is determined whether or not the rough road decision flag XDIRT is equal to "0". If it is determined that XDIRT is equal to "0", that is, if it is determined that the vehicle traveling road is not rough, the process starting from step 104 shown in FIG. 9 is executed in order to start the brake assist control. In contrast, if it is determined that XDIRT is not equal to "0", a process of step 162 is executed.

At step 162, the roughness level of the load on which the vehicle is traveling. The roughness level of the road is decided so that the ECU 10 executes a rough road decision routine that will be described later.

Figure 11:
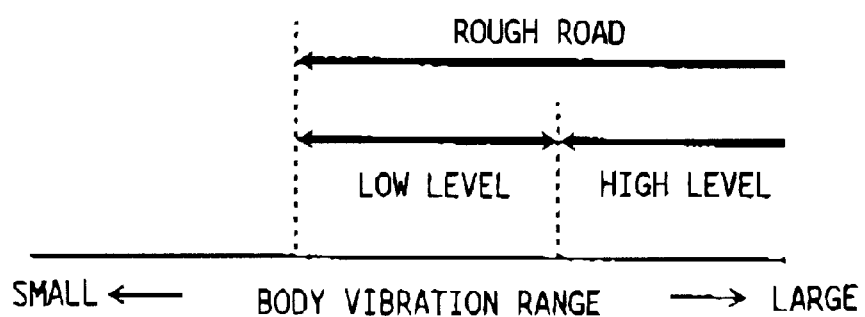
FIG. 11 is a diagram showing a relationship between a roughness level decided in the control routine shown in FIGS. 8 and 9.

FIG. 11 is a diagram showing a relationship between the roughness level decided by the rough road decision routine and a vibration range of the vehicle. As shown in FIG. 11, the ECU 10 decides the roughness level to be "low" if the vibration range of the vehicle is comparatively small, and decides the roughness level to be "high" if the vibration range of the vehicle is comparatively large.

In the present routine, when the process of step 162 ends, a process of step 164 is executed.

At step 164, it is determined whether the roughness level is "low" and is further determined whether or not the operation level is "2" or "3". When the roughness level is "low", it can be estimated that the vibration of the vehicle body does not greatly affect the braking operation. Hence, if the operation level equal to or greater than "2" is detected under the above situation, it can be estimated with a high probability that the braking operation the intentional operation by the driver. Thus, if the condition of step 164 stands, the process starting from step 104 is executed immediately after step 164 in order to start the brake assist control. In contrast, if the condition of step 164 does not stand, that is, if ① the roughness level is "high", and ② the operation level is "1" although the roughness level is "low", a process of step 166 is executed.

At step 166, it is determined whether the roughness level is "high" and is further determined whether the operation level is "3". When the roughness level is "high", it can be estimated that the vibration of the body greatly affects the braking operation. However, even when the roughness level is "high", the operation level of "3" is not actually detected unless the driver performs the emergency braking. Hence, when the condition of step 166 stands, it can be determined that the driver performs the emergency braking. In this case, according to the present routine, the process of step 104 is executed.

In contrast, when the condition of step 166 does not stand, that is, if ① the operation level is "1" or "2" although the roughness level is "high", and ② the roughness level is "low" and simultaneously the operation level is "1", it can be estimated that there is a high probability that the braking operation detected may result from the vibration of the body. In this case, it is determined that the brake assist control should not be started, and the routine in progress is immediately ended.

At the steps 104 to 112 shown in FIG. 9, it is determined whether the braking operation stems from the driver's intention on the basis of the time it takes for the variation ratio ΔP<sub>M/C</sub> to exceed the first threshold value α and then become equal to or less than the second threshold value β. If it is determined that the braking operation is due to the driver's intention, the process starting from step 118 is executed. At steps 118 to 126, the process for starting the brake assist control is executed after the predetermined delay time D elapses.

according to the above process, it is possible to use different conditions for execution of the brake assist control in the respective cases where ① the road on which the vehicle is traveling is not rough, ② the road on which the vehicle is traveling is rough and the roughness level is "low", and ③ the road on which the vehicle is traveling is rough and the roughness level is "high". As the roughness level is higher, it is possible to crease a situation in which the brake assist control is started with more difficulty.

Hence, according to the brake assist control apparatus of the present embodiment, the brake assist control can be started when the driver requires an emergency braking irrespective of whether the road on which the vehicle is traveling is rough or not, and can appropriately be inhibited from being unnecessarily started due to influence of an external turbulence such as a rough road.

Figure 12:
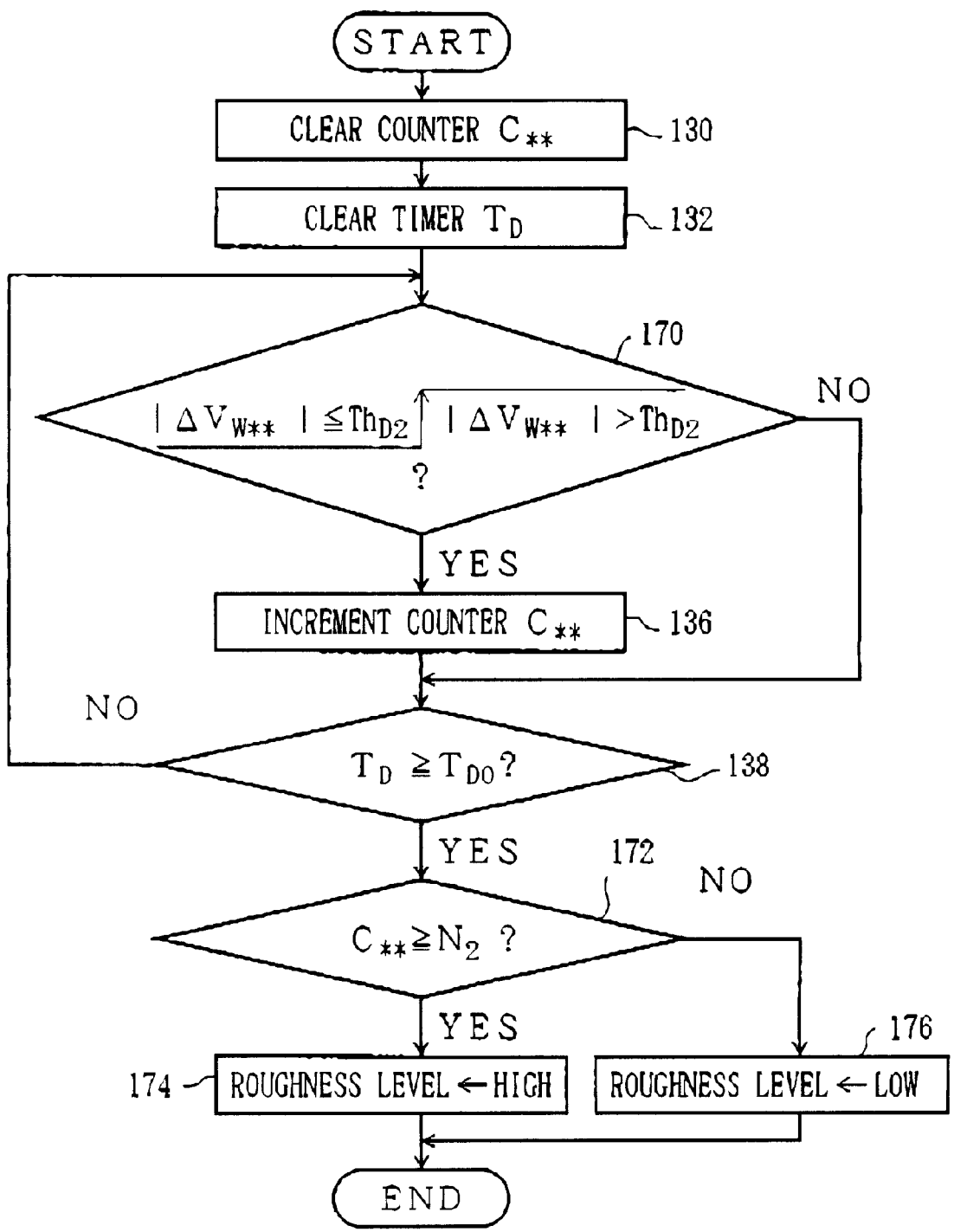
FIG. 12 is a flowchart of a roughness level decision routine executed in the brake force control apparatus according to the second embodiment of the present invention.
Figure 13:
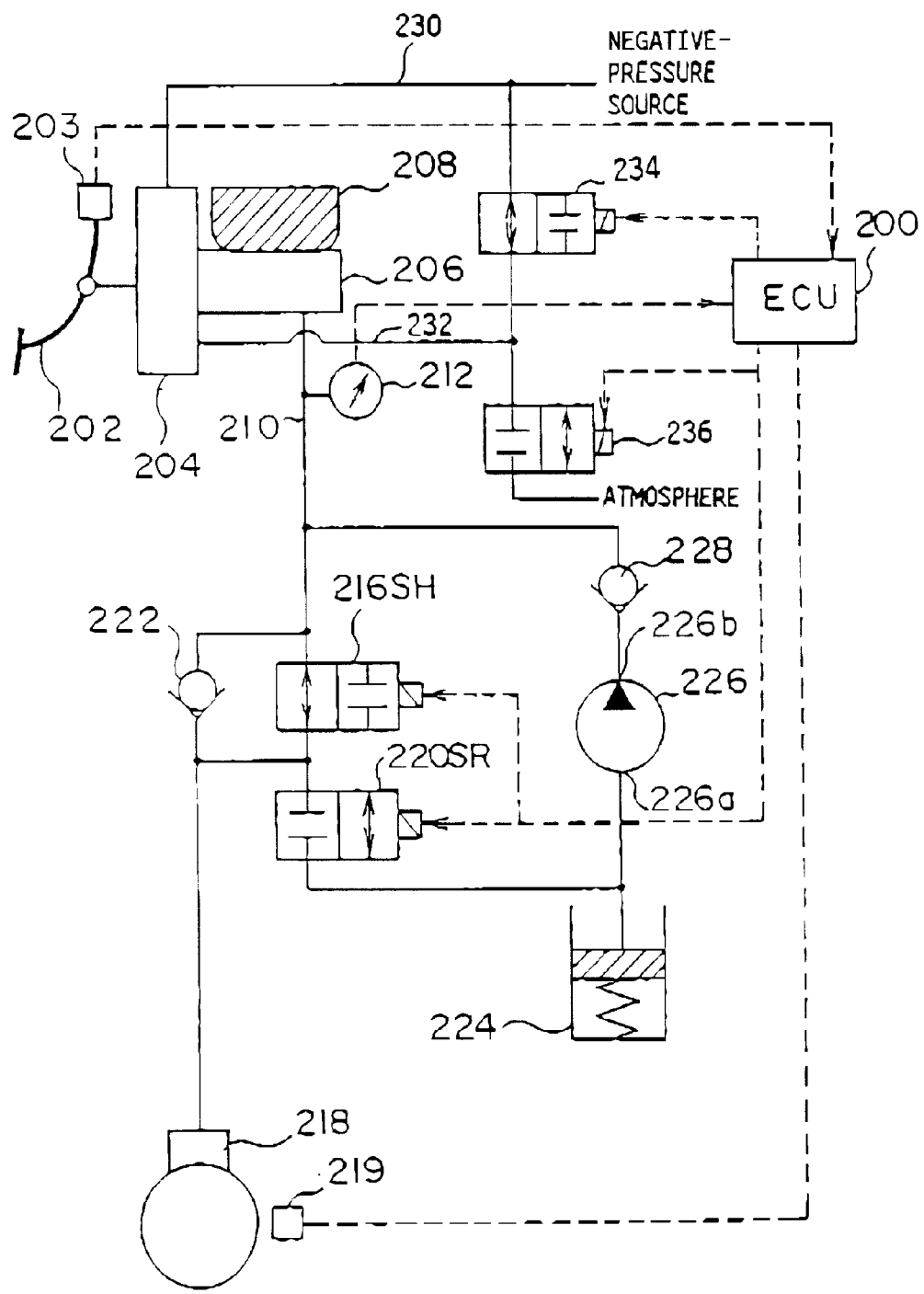
FIG. 13 is a system structure diagram of a brake force control apparatus according to a third embodiment of the present invention.

FIG. 12 is a flowchart of an example of a control routine executed by the ECU 10 and directed to detecting the roughness level of the road on which the vehicle is traveling. The routine shown in FIG. 12 is a predetermined-time-based interruption routine that is activated every given time. In FIG. 12, steps that execute the same processes as those of the steps shown in FIG. 6 are given the same reference numbers, and a description thereof will be omitted or given briefly.

At step 170, it is determined whether the variation ratio |ΔV<sub>W</sub>| changes from a value equal to or less than a threshold value Th<sub>D2</sub> to a value exceeding the threshold value Th<sub>D2</sub> between the last process cycle and the present process cycle. The threshold value Th<sub>D2</sub> is a value of the variation ratio |ΔV<sub>W</sub>| which frequently occurs when the roughness level is "high" and is greater than ThD1 used at the aforementioned step 134.

At step 170, if it is determined that a change in the variation ratio |ΔVw| exceeding ThD2 occurs, the process of step 136 is executed and then the process of step 138 is executed. In contrast, if it is determined that a change in the variation ratio |ΔVw| exceeding ThD2 does not take place, step 136 is bypassed, and the process of step 138 is executed immediately.

The processes of the steps 170, 136 and 138 are repeatedly executed until it is determined at step 138 that TD TD0 stands. When it is determined that TD TD0 stands, a process of step 172 is then executed. According to the above process, the counters C** count the number of times that a wheel velocity change exceeding the threshold value ThD2 occurs in the respective wheels FL, FR, RL and RR occurs during TD0.

At step 172, it is determined whether or not the count values of the counters C are equal to or greater than a predetermined value N2. If C N2 stands for any of the counters C, it can be determined that the roughness level of the road on which the vehicle is traveling is "high", and a process of step 174 is executed. When the process of step 174** ends, the routine in progress is terminated.

In contrast, if it is determined at step 172 that C N2 does not stand in any of the counters C at all, it can be determined that the roughness level of the road on which the vehicle is traveling is "low", and a process of step 176 is executed.

At step 176, the process for setting the roughness level to be low. When the process of step 176 ends, the routine in progress is ended.

According to the above process, based on the variations in the wheel velocities Vw**, it is possible to appropriately decide the roughness level to be low if the vibration range of the body is determined as being large and decide the roughness level to be high if the vibration range of the body is determined as being small.

In the routine shown in FIG. 12, the roughness level is determined based on the wheel velocities Vw of all of the wheels FL, FR, RL and RR. However, the method for deciding the roughness level is not limited to the above but the roughness level may be decided based on the wheel velocity Vw of only one of the wheels.

When the vehicle is equipped with an acceleration sensor that senses an acceleration exerted on the vehicle in the forward and backward directions or the upward and downward directions or stroke sensors that respectively sense the magnitudes of strokes of the wheels FL, FR, RL and RR, it may be possible to decide the roughness level from the outputs of the sensors and determine whether or not the road on which the vehicle is traveling is rough by determining whether or not the level of the detected vibration is equal to or greater than a given level. Alternatively, it is possible to determine whether the road is rough by using a non-contact type sensor and directly detecting the condition of the road surface.

Also, in the above-described embodiment, the brake assist control is inhibited when the vehicle is passing a step. However, the present invention is not limited to the above. More particularly, as in the case where the vehicle is traveling on a rough road, when the vehicle is passing a step, the condition for execution of the brake assist control is altered so that it becomes difficult for the brake assist control to be started during only the above time.

A description will now be given, with reference to FIG. 12, of a third embodiment of the present invention. FIG. 12 is a diagram of a system configuration of the brake force control apparatus according to the present embodiment. In FIG. 12, only a part of the configuration related to a single wheel is depicted for the convenience of description.

The brake force control apparatus shown in FIG. 12 is controlled by the ECU 200. The brake force control apparatus of the present embodiment is equipped with a brake pedal 202. A brake switch 203 is disposed in the vicinity of the brake pedal 202. The brake switch 203 generates an ON output when the brake pedal 202 is pressed. The output signal of the brake switch 203 is supplied to the ECU 200. The ECU 200 determines, based on the output signal of the brake switch 203, whether the braking is performed.

The brake pedal 202 is joined to a vacuum booster 204. The vacuum booster 204 operates with a drive source, which is depression at a manifold of an internal combustion engine. When the brake pressing force FP is applied to the brake pedal 30, the vacuum booster 204 generates an assist force FA having a given power ratio with respect to the brake pressing force FP. A master cylinder 206 is fixed to the vacuum booster 204. The resultant of the brake pressing force FP and the assist force FA is input to the master cylinder 206.

The master cylinder 206 is equipped with a fluid pressure chamber provided therein. A reservoir tank 208 is arranged on the upper portion of the master cylinder 206. The fluid pressure chamber and the reservoir tank 208 are joined together when the brake pedal 202 is in the released state, and are isolated from each other when the brake pedal 202 is pressed. Hence, the brake fluid is supplemented each time the brake pedal 202 is released from the pressed state.

A fluid pressure passage 210 is joined to the fluid pressure chamber of the master cylinder 206. A hydraulic sensor 210, which generates an electric signal based on the internal pressure of the fluid pressure passage 210, is disposed to the fluid pressure passage 210. The output signal of the hydraulic pressure sensor 212 is supplied to the ECU 200. The ECU 200 detects the fluid pressure generated by the master cylinder 206, namely, the master cylinder pressure PM/C on the basis of the output signal of the hydraulic pressure sensor 212.

The fluid pressure passage 210 is provided with a holding solenoid 216 (hereinafter, referred to as SH 216) on the downstream side of the SC 214. The SH 216 is a two-position solenoid valve which maintains an open state in a normal state (OFF state). The SH 216 is set to be in an ON state (closed state) by a drive signal being supplied by the ECU 200.

The downstream side of the SH 216 communicates with a wheel cylinder 218 and a pressure decreasing solenoid 220 (hereinafter, referred to as SR220). The SR 220 is a two-position solenoid value, which maintains a closed state in a normal state (OFF state). SR 220 is set to be in an ON state (open state) by a drive signal being supplied by the ECU 200. Additionally, a check value 222 which permits a fluid flow only in a direction from the wheel cylinder 218 to the fluid pressure passage 210 is provided between the wheel cylinder 218 and the fluid pressure passage 210.

A wheel velocity sensor 219 generates a pulse signal each time the wheel rotates a predetermined angle is provided near the wheel cylinder 218. An output signal of the wheel velocity sensor 219 is supplied to the ECU 200. The ECU 200 detects a wheel velocity based on the output signal of the wheel velocity sensor 219.

A reservoir 224 is provided on the downstream side of the SR 220. The brake fluid flowing out of the SR 220 when the SR 220 is set to be in the ON state (open state) is stored in the reservoir 224. It should be noted that the reservoir previously stores a predetermined amount of brake fluid. The reservoir 224 communicates with an inlet port 226a of a pump 226. Additionally, an outlet port 226b of the pump 226 communicates with the fluid pressure passage 210 via a check valve 228. The check vale 228 is a one-way valve, which permits a fluid flow only in a direction from the pump 226 to the fluid pressure passage 210.

A fluid pressure passage 230 connected to the reservoir tank 208 is joined to the reservoir 224. A switch solenoid 234 (hereinafter simply referred to as SCH 234) is disposed to the fluid pressure passage 230. The SCH 234 is a two-position solenoid valve, which maintains the closed state in the normal state (OFF state). The SCH 234 is switches to the closed state in response to a supply of the drive signal from the ECU 200.

The vacuum booster 204 is equipped with a negative pressure chamber and a pressure-changing chamber, which are isolated by a diaphragm. The negative pressure chamber is connected to a negative-pressure passage 230, and is maintained at a given negative pressure while the vehicle is operating. The pressure-changing chamber is connected to a pressure adjustment passage 232 and a atmosphere space via a valve mechanism, which adjusts the inner pressure of the pressure-changing chamber. The valve mechanism operates in cooperation with the operation of the brake pedal 202 as follows.

The valve mechanism connects the pressure changing chamber to the atmosphere space until a differential pressure based on the brake pressing force $F_P$ is generated between the pressure changing chamber and the negative pressure chamber when a negative pressure is introduced into the pressure adjustment passage 232. In this case, an urging force based on the differential pressure between the pressure changing chamber and the negative pressure chamber, namely, the brake pressing force $F_P$ is exerted on the diaphragm. The vacuum booster 204 transfers the urging force to the master cylinder 206 as a brake assist force $F_A$. The valve mechanism introduces the atmosphere pressure to the pressure changing chamber when the atmosphere pressure is introduced into the pressure adjustment passage 232 irrespective of the brake pressing force $F_P$. In this case, the urging pressure based on the differential pressure between the inner pressure of the negative pressure chamber and the atmosphere pressure is exerted on the diaphragm, and a maximum brake assist force $F_{AMAX}$ is generated by the vacuum booster.

A description will now be given of an operation of the brake force control apparatus of the present invention.

In the system of the present embodiment, the ECU 200 executes the normal control when the driver performs the normal braking operation. In the normal control, a negative-pressure valve 234 and an atmosphere intake valve 236 are both maintained in the OFF state. In this case, the vacuum booster 204 generates the brake assist force $F_A$ based on the brake pressing force $F_P$. Thus, the integrated force of the brake pressing force $F_P$ and the brake assist force $F_A$ is transferred to the master cylinder 206.

When the integrated force of the brake pressing force $F_P$ and the brake assist force $F_A$ is transferred to the master cylinder 206, the master cylinder 206 generates the master cylinder pressure $P_{M/C}$ having a given power ratio with respect to the brake pressing force $F_P$. If a slip ratio S of the wheels is less than a predetermined value, the ECU 200 turns OFF the SH 216 and SR 220, and maintains the pump 226 in the inactive state. Hereinafter, the above state is referred to as a normal state. When the hydraulic pressure circuit is in the normal state, the master cylinder pressure $P_{M/C}$ is introduced to the wheel cylinder 218 as it is. Hence, the wheel cylinder pressure $P_{W/C}$ based on the brake pressing force $F_P$ is generated in the wheel cylinder 218.

When the slip ratio S of the wheels exceeds the predetermined value after the braking operation is started, the ECU 200 starts the ABS control in the same manner as the ECU 10 in the first embodiment. The ABS control is realized by driving the SH 216 and SR 220 while operating the pump 226 when the brake pedal 202 is depressed, that is, when the master cylinder pressure $P_{M/C}$ is appropriately boosted.

When the SH 216 is set to the open state and the SR 220 is set to the closed state with the master cylinder pressure $P_{M/C}$ boosted appropriately, the wheel cylinder pressure $P_{W/C}$ can be boosted up to the master cylinder pressure $P_{M/C}$. Hereinafter, the above state is referred to as ① pressure-increasing mode. Under the same environment as described above, if the SH 216 is set to the closed state and the SR 220 is set to the closed state, the wheel cylinder pressure $P_{W/C}$ can be maintained. If the SH 216 is set to the closed state and the SR 220 is set to the open state, the wheel cylinder pressure $P_{W/C}$ can be reduced. These states will hereinafter be referred to ② holding mode and ③ pressure-decreasing mode, respectively. The ECU 200 realizes ① pressure-increasing mode, ② holding mode and ③ pressure-decreasing mode so that the slip ratio S of the wheels is prevented from having an inappropriately large value.

If the brake pedal 202 is released from the pressed state by the driver while the ABS control is active, it is necessary to rapidly reduce the wheel cylinder pressure $P_{W/C}$. In the system of the present embodiment, a check valve 222 which permits a flow of fluid from the wheel cylinder 218 to the master cylinder 206 is disposed to a hydraulic pressure circuit corresponding to the wheel cylinder 218. Hence, according to the system of the present embodiment, it is possible to rapidly reduce the wheel cylinder pressure $P_{W/C}$ of the wheel cylinder 222 after the brake pedal 202 is released from the pressed state.

While the ABS control is being executed in the system of the present embodiment, the wheel cylinder pressure $P_{W/C}$ is boosted in such a way that the master cylinder 206 serves as the fluid pressure source. Also, the wheel cylinder pressure $P_{W/C}$ can be reduced by flow the brake fluid in the wheel cylinder 218 to the reservoir 224. Hence, if the pressure-increasing mode and the pressure-decreasing mode are alternately performed, the brake fluid gradually flows to the reservoir 224 from the master cylinder 206. However, in the system of the present embodiment, the brake fluid flowing to the reservoir 224 is pressure-sent to the master cylinder 206 by the pump 226. Hence, even if the ABS control continues for a long time, the bottoming of the master cylinder will not occur.

When the driver performs the emergency braking, then the ECU 200 executes the brake assist control. The brake assist control is realized by turning ON both the negative-pressure intake valve 234 and the atmosphere intake valve 236, that is, setting the negative-pressure intake valve 234 to the closed state and setting the atmosphere intake valve 236 to the open state.

In the system of the present embodiment, when the brake assist control is started, the atmosphere is introduced into the pressure adjustment passage 232. As described above, the vacuum booster 204 generates the maximum brake assist force $F_{AMAX}$ when the atmosphere is introduced into the pressure adjustment passage 232. Hence, when the brake assist control is started, the integrated force of the maximum brake assist force $F_{AMAX}$ and the brake pressuring force $F_P$ is transferred to the master cylinder 206.

The ECU 200 maintains the hydraulic pressure circuit connected to the master cylinder 206 in the normal state until the condition for executing the ABS stands. In this case, the master cylinder pressure $P_{M/C}$ is applied to the wheel cylinder 218. Hence, the wheel cylinder pressure $P_{W/C}$ is rapidly increased to a pressure based on "$F_{AMAX}$"+"$F_P$" from "$F_A+F_P$" before the brake assist control is started.

As described above, according to the system of the present embodiment, when the emergency braking is performed, the wheel cylinder pressure $P_{W/C}$ can rapidly be boosted to a value which is much greater than that obtained by the normal braking force $F_P$. Hence, according to the system of the present embodiment, even when the driver is a beginner-grade driver, a large braking force can be generated soon after a situation required for emergency braking takes place.

If the wheel cylinder pressure $P_{W/C}$ is rapidly increased as described above, the slip ratio S of the wheels is abruptly increased, and then the condition for execution of the ABS control stands. When the condition for execution of the ABS control stands, the ECU 200 ① pressure-increasing mode, ② holding mode and ③ pressure-decreasing mode so that the slip ratio S of the wheels can be prevented from having an inappropriately large value.

In the system of the present embodiment, after the brake assist control is started, the master cylinder pressure $P_{M/C}$ is maintained at a pressure based on "$F_{AMAX}+F_P$" as long as the brake pressing force $F_P$ is applied to the brake pedal 202. In contrast, when the brake pedal 202 is released from the pressed state after the brake assist control is started, the master cylinder pressure $P_{M/C}$ is reduced to a pressure based on "$F_{AMAX}$".

Hence, the ECU 200 monitors the output signal of the master cylinder pressure $P_{M/C}$ detected by the hydraulic pressure sensor 212, so that it can easily be determined whether the brake pedal 202 is released from the pressed state. When the ECU 200 detects that the brake pedal 202 is released from the pressed state, the ECU 200 stops supplying the drive signals to the negative-pressure intake valve 234 and the atmosphere pressure intake valve 236, and terminates the brake assist control.

The brake force control apparatus of the present embodiment is characterized in that the ECU 200 makes a decision as to whether the brake assist control is permitted to be executed by performing ① the routines shown in FIGS. 4 and 5, ② the routine shown in FIG. 6 and ③ the routine shown in FIG. 7 as in the case of the ECU 10 in the first embodiment, or by performing ① the routines shown in FIGS. 8 and 9, ② the routine shown in FIG. 6, ③ the routine shown in FIG. 7 and ④ the routine shown in FIG. 12 as in the case of the ECU 10 employed in the second embodiment.

That is, the ECU 200 determines, after the brake pedal 202 is depressed, whether the condition for starting the brake assist control stands on the basis of the master cylinder pressure $P_{M/C}$ and the variation ratio $\Delta P_{M/C}$. Also, the ECU 200 determines whether the braking operation results from the driver's intention or an external turbulence such as a rough road on the basis of the time it takes for the variation ratio $\Delta P_{M/C}$ to exceed the first threshold value $\alpha$ and becomes equal to or less than the second threshold value $\beta$ is shorter than the predetermined time T1. Further, the ECU 200 alters the condition for executing the brake assist control in accordance with the state of the road on which the vehicle is traveling or the state of vibration of the body. Then, the ECU 200 starts the brake assist control when it is determined that the brake operation meeting the condition for execution of the brake assist control by the intentional operation of the driver.

Hence, according to the brake force control apparatus of the embodiments, it is possible to certainly execute the brake assist control when the driver performs an emergency brake as in the aforementioned first and second embodiments and to inhibit the brake assist control from being unnecessarily executed when the vehicle is traveling on a rough road or passing a step.

What is claimed is:

1. A brake force control apparatus, comprising:
   means for executing a normal control to generate a brake force on a vehicle based on a brake pressing force;
   means for executing a brake assist control to generate a brake force greater than the brake force generated during the normal control;
   operation speed detection means for detecting a brake operation speed;
   execution condition determination means for determining that a condition for execution of the brake assist control exists when the brake operation speed exceeds a predetermined speed;
   body vibration detection means for detecting a body vibration of a vehicle; and
   execution condition changing means for changing said predetermined speed on the basis of the body vibration.

2. The brake force control apparatus as claimed in claim 1, wherein:
   said body vibration detection means further including wheel velocity detection means for detecting wheel velocities; and
   said execution condition changing means changes said predetermined speed when a variation ratio exceeding a threshold value occurs in the wheel velocities.

3. The brake force control apparatus as claimed in claim 1, wherein:
   said execution condition changing means changes said predetermined speed to a higher speed until a rear wheel passes a step after a front wheel rides over the step, the step being detected by a step detection means.

4. The brake force control apparatus as claimed in claim 1, wherein:
   said execution condition changing means changes said predetermined speed based on a roughness level of a road, the roughness level being detected by a roughness level detection means.

5. The brake force control apparatus as claimed in claim 4,
   wherein said roughness level detection means determines a value of the roughness level on the basis of a range of the body vibration.

6. A brake force control apparatus, comprising:
   means for executing a normal control to generate a brake force on a vehicle based on a brake pressing force;
   means for executing a brake assist control to generate a brake force greater than the brake force generated during the normal control;
   operation speed detection means for detecting a brake operation speed;
   execution condition determination means for determining that a condition for execution of the brake assist control exists when the brake oerpation speed exceeds a predetermined speed;
   body vibration detection means for detecting a body vibration of a vehicle; and
   execution inhibiting means for inhibiting execution of the brake assist control when a predetermined body vibration is detected.

7. The brake force control apparatus as claimed in claim 6, wherein:

said body vibration detection means further includes wheel velocity detection means for detecting wheel velocities; and said execution inhibiting means inhibits execution of the brake assist control when a variation ratio exceeding a threshold value occurs in the wheel velocities.

8. The brake force control apparatus as claimed in claim 1, wherein:

said execution inhibiting means inhibits execution of the brake assist control until a rear wheel passes a step after a front wheel rides over the step, the step being detected by a step detection means.

9. A brake force control apparatus, comprising:

means for executing a normal control to generate a brake force on a vehicle based on a brake pressing force;

means for executing a brake assist control to generate a brake force greater than the brake force generated during the normal control;

operation speed detection means for detecting a brake operation speed;

execution condition determination means for determining that a condition for execution of the brake assist control exists when the brake operation speed exceeds a predetermined speed;

road surface condition detection means for detecting a road surface condition; and execution condition changing means for changing said predetermined speed on the basis of the road surface condition.

10. The brake force control apparatus as claimed in claim 9, wherein:

said road surface condition detection means further includes wheel velocity detection means for detecting wheel velocities; and said execution condition changing means changes said predetermined speed when a variation ratio exceeding a threshold value occurs in the wheel velocities.

11. The brake force control apparatus as claimed in claim 9, wherein:

said execution condition changing means changes said predetermined speed to a higher speed until a rear wheel passes a step after a front wheel rides over the step, the step being detected by a step detection means.

12. The brake force control apparatus as claimed in claim 9, wherein:

said execution condition changing means changes said predetermined speed based on a roughness level of a road, the roughness level being detected by a roughness level detection means.

13. The brake force control apparatus as claimed in claim 12, wherein said roughness level detection means determines a value of the roughness level on the basis of a range of the body vibration.

14. A brake force control apparatus, comprising:

means for executing a normal control to generate a brake force on a vehicle based on a brake pressing force;

means for executing a brake assist control to generate a brake force greater than the brake force generated during the normal control;

operation speed detection means for detecting a brake operation speed;

execution condition determination means for determining that a condition for execution of the brake assist control exists when the brake operation speed exceeds a predetermined speed;

road surface condition detection means for detecting a road surface condition; and execution inhibiting means for inhibiting execution of the brake assist control when a predetermined road surface condition is detected.

15. The brake force control apparatus as claimed in claim 14, wherein:

said road surface condition detection means further includes wheel velocity detection means for detecting wheel velocities; and said execution inhibiting means inhibits execution of the brake assist control when a variation ratio exceeding a threshold value occurs in the wheel velocities.

16. The brake force control apparatus as claimed in claim 14, wherein:

said execution inhibiting means inhibits execution of the brake assist control until a rear wheel passes a step after a front wheel rides over the step, the step being detected by a step detection means.

* * * * *